(12) United States Patent
Nakatsuyama

(10) Patent No.: US 6,389,536 B1
(45) Date of Patent: May 14, 2002

(54) DEVICE FOR VERIFYING USE QUALIFICATIONS

(75) Inventor: Hisashi Nakatsuyama, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/236,393

(22) Filed: Jan. 25, 1999

(30) Foreign Application Priority Data

Feb. 9, 1998 (JP) .......................................... 10-027326

(51) Int. Cl.⁷ ............................. H04L 9/00; H04L 9/28; H04L 9/30; H04K 1/00
(52) U.S. Cl. ...................... 713/165; 713/167; 713/170; 713/171; 713/156; 713/180; 380/30; 705/74
(58) Field of Search ................................ 713/165, 167, 713/168, 170, 171, 156, 180; 380/28, 30; 705/69, 74

(56) References Cited

U.S. PATENT DOCUMENTS

| | | | | |
|---|---|---|---|---|
| 4,771,461 A | * | 9/1988 | Matyas ....................... 380/282 |
| 4,996,711 A | * | 2/1991 | Chaum ........................ 380/30 |
| 5,371,796 A | * | 12/1994 | Avarne ........................ 380/28 |
| 5,586,186 A | | 12/1996 | Yuval et al. |
| 5,710,834 A | * | 1/1998 | Rhoads ........................ 380/18 |
| 5,720,035 A | * | 2/1998 | Allegre et al. .............. 713/201 |
| 5,825,880 A | * | 10/1998 | Sudia et al. ................... 380/30 |
| 6,011,848 A | * | 1/2000 | Kanda et al. ................. 380/28 |
| 6,044,463 A | * | 3/2000 | Kanda et al. ............... 713/168 |
| 6,085,320 A | * | 7/2000 | Kaliski, Jr. ................. 713/168 |
| 6,088,797 A | * | 7/2000 | Rosen ........................ 713/167 |
| 6,094,656 A | * | 7/2000 | De Jong ...................... 705/40 |
| 6,189,098 B1 | * | 2/2001 | Kaliski, Jr. ................. 713/168 |
| 6,209,091 B1 | * | 3/2001 | Sudia et al. ................. 713/156 |

OTHER PUBLICATIONS

Schneier, *Applied Cryptography, Second Edition; Protocols, Algorithms, And Source Code In C*, John Wiley & Sons, Inc., (1996).

* cited by examiner

*Primary Examiner*—Albert Decady
*Assistant Examiner*—Kambiz Zand
(74) *Attorney, Agent, or Firm*—Oliff & Berridge, PLC

(57) ABSTRACT

Authentication is performed at a high speed even in a device with small CPU power and memory. A challenge information computation unit of a verification instrument generates a random number and transfers the random number and identification information together as challenge information to a proving instrument. A unidirectional function computation unit of a proving instrument applies a unidirectional function to private information stored in a private information memory unit and right identification information of challenge information. A response information computation unit performs operations on a computation result of the unidirectional function and the proof support information to obtain proof information. A unidirectional function computation part applies a unidirectional function to the proof information and a random number contained in the challenge information to obtain response information and returns it to the verification unit. A unidirectional function computation unit of the verification instrument applies a unidirectional function to the proof information and a random number of the challenge information. A response information verification instrument compares the application result of the unidirectional function with the response information and acknowledges use qualifications if and only if they coincide.

10 Claims, 15 Drawing Sheets

DEVICE FOR VERIFYING USE QUALIFICATIONS

BACKGROUND OF THE INVENTION

1. Field of the Invention

The present invention relates to a device for verifying use qualifications.

2. Description of the Prior Art

With the development of networks, intellectual properties represented by digital information such as software and multimedia data are growing rapidly. The digital information can be duplicated easily and illegally without leaving evidence. Hence, there is a problem with the protection of a copyright on digital information.

Tickets are commonly used as the representation of a right for use and attempts to digitize them have been carried out. However, this poses the same copyright protection problem as described above.

A conventional technique for verifying qualifications for using software is disclosed in U.S. Pat. No. 5,586,186 (hereinafter referred to as the prior art). This technique, which implements access control of software, can also be used to digitize tickets by acknowledging use qualifications in a manner that sees whether given encrypted information is correctly decrypted, instead of decrypting encrypted software.

With the prior art, encrypted software is distributed, and when a user wishes to use the software, information for decrypting (user key) is purchased from a software vendor. RSA (Rivest-Shamir-Adleman) public key cryptography is used for encryption, and a value obtained by performing a predetermined operation on a private key of an RSA public key pair and user identification information is used as a user key.

The prior art employs an RSA-based authentication system which is computatively complex. According to Bruce Schneier, Applied Cryptography (second edition), Wiley, 1996, by use of the RSA cryptography that uses modulus of 1024 bits and public key of eight bits, a workstation (SPARC2) requires 0.97 seconds for signature and 0.08 seconds for verification to process 1024 bits of data. Accordingly, devices such as an IC card, which have much smaller CPU power and memory than those of workstations, have a problem that too much time is required for authentication.

SUMMARY OF THE INVENTION

The present invention has been made in consideration of the above problem and its object is to implement a use qualification verification device which enables even devices having small CPU power and memory to perform authentication fast.

To solve the above-mentioned problem, a use qualification verification device according to Claim 1 comprises a proof support information issuance unit, a verification unit, and a proof unit. The proof support information issuance unit comprises: a proof information management part that manages proof information: used for authentication of use qualifications; a private information management part that manages private information; a first unidirectional function computation part used to compute proof support information; a proof support information computation part that computes proof support information; and a first communication part. The verification unit comprises: a proof information memory part that stores proof information; a challenge information computation part that computes challenge information; a second unidirectional function computation part; a response information verification part that verifies response information; and a second communication part. Furthermore, the proof unit comprises: a private information memory part that stores private information; a proof support information management part that manages proof support information; a third unidirectional function computation part; a response information computation part that computes response information; and a third communication part.

A use qualification verification device according to Claim 2 comprises a proof support information issuance unit, a verification unit, and a proof unit. The proof support information issuance unit comprises: a proof information management part that manages proof information; a private information management part that manages private information; a first unidirectional function computation part used to compute proof support information; a proof support information computation part that computes proof support information; and a first communication part. The verification unit comprises: a first private information memory part that stores private information; a first proof support information management part that manages proof support information; a challenge information computation part that computes challenge information; a second unidirectional function computation part; a response information verification part that verifies response information; and a second communication part. Furthermore, the proof unit comprises: a second private information memory part that stores private information; a second proof support information management part that manages proof support information; a third unidirectional function computation part; a response information computation part that computes response information; and a third communication part.

A use qualification verification device according to Claim 3 is a use qualification verification device set forth in Claim 1 or 2, wherein the proof information management part manages a use limitation description, which gives information indicating use conditions, together with proof information, and the proof support information management part manages the use limitation description together with proof support information, and the use limitation description is used to compute proof support information in the proof part and response information in the proof part.

A use qualification verification device according to Claim 4 is a use qualification verification device set forth in Claim 1 through 3, wherein the use qualification verification device includes a decryption part that, if use qualifications are acknowledged, decrypts information by using proof information or a value obtained from the proof information as a decryption key of the decryption part.

A use qualification verification device according to Claim 5 is a use qualification verification device set forth in Claim 1 through 4, wherein the use qualification verification device includes a history management part that manages a history of use qualification verifications and a first proof support information management part manages transfer information together with proof support information, the challenge information further contains transfer information, and the transfer information is stored in the history management part during use qualification verification.

A use qualification verification device according to Claim 6 comprises a proof support information issuance unit, a verification unit, and a proof unit. The proof support information issuance unit comprises: a proof information management part that manages proof information used for authentication of use qualifications; a private information management part that manages private information; a first unidirectional function computation part that, to at least the private information managed by the private information management part, applies a unidirectional function whose inverse function is at least computationally difficult to obtain; a proof support information computation part that computes proof support information based on the private information managed by the private information management part and the computation results of the first unidirectional function computation part; and a first communication part that sends and receives information in the process of computation of proof support information. The verification unit comprises: a proof information memory part that stores proof information; a first challenge information computation part that computes first challenge information; a second unidirectional function computation part that applies a unidirectional function whose inverse function is at least computationally difficult to obtain; a first response information computation part that lets the second unidirectional function computation part act on received second challenge information to compute first response information; a first response information verification part that lets the second unidirectional function computation part act on the proof information stored in the proof information memory unit and a value obtained based on a part or all of the first challenge information and checks whether an obtained result and second response information are equal; and a second communication part that sends and receives information in the process of authentication of use qualifications. Furthermore, the proof unit comprises: a private information memory part that stores private information; a proof support information management part that manages proof support information used to create response information; an internal state management part that manages an internal state corresponding to proof support information; a second challenge information computation part that computes challenge information; a third unidirectional function computation part that applies a unidirectional function whose inverse function is at least computationally difficult to obtain; a second response information computation part that lets the third unidirectional function computation part act on a part or all of received information, the private information stored in the private information memory part, and a value obtained based on the proof support information managed by the proof support information management part to compute second response information; a second challenge information computation part that computes second challenge information; a second response information verification part that lets the third unidirectional function computation part act on the first response information, a part or all of the second challenge information, the private information stored in the private information memory part, and a value obtained based on the proof support information managed by the proof support information management part and checks whether an obtained result and response information are equal; and a third communication part that sends and receives information in the process of authentication of use qualifications and in the process of proof support information computation.

A use qualification verification device according to Claim 7 comprises a proof support information issuance unit, a verification unit, and a proof unit. The proof support information issuance unit comprises: a proof information management part that manages proof information used for authentication of use qualifications; a private information management part that manages private information; a first unidirectional function computation part that, to at least the private information managed by the private information management part, applies a unidirectional function whose inverse function is at least computationally difficult to obtain; a proof support information computation part that computes proof support information based on the private information managed by the private information management part and the computation results of the first unidirectional function computation part; a first communication part that sends and receives information in the process of computation of proof support information; a first private information memory part that stores private information; a first proof support information management part that manages proof support information; a first challenge information computation part that computes first challenge information; a second unidirectional function computation part that applies a unidirectional function whose inverse function is at least computationally difficult to obtain; a first response information computation part that lets the second unidirectional function computation part act on the received second challenge information to compute first response information; a first response information verification part that lets the second unidirectional function computation part act on the proof information stored in the proof information memory unit and a value obtained based on a part or all of the first challenge information and checks whether an obtained result and second response information are equal; and a second communication part that sends and receives information in the process of authentication of use qualifications. Furthermore, the proof unit comprises: a second private information memory part that stores private information; a second proof support information management part that manages proof support information used to create response information; an internal state management part that manages an internal state corresponding to proof support information; a second challenge information computation part that computes challenge information; a third unidirectional function computation part that applies a unidirectional function whose inverse function is at least computationally difficult to obtain; a second response information computation part that lets the third unidirectional function computation part act on a part or all of received information, the private information stored in the private information memory part, and a value obtained based on the proof support information managed by the proof support information management part to compute second response information; a second challenge information computation part that computes second challenge information; a second response information verification part that lets the third unidirectional function computation part act on the first response information, a part or all of the second challenge information, the private information stored in the private information memory part, and a value obtained based on the proof support information managed by the proof support information management part and checks whether an obtained result and response information are equal; and a third communication part that sends and receives information in the process of authentication of use qualifications and in the process of proof support information computation.

A use qualification verification device according to Claim 8 is a use qualification verification device set forth in Claim 6 or 7, wherein a proof information management part manages a use limitation description, which gives information indicating use conditions, together with proof information, and a proof support information management part manages the use limitation description together with proof support information and includes the use limitation description to compute proof support information used in the proof part and response information generated in the proof part.

A use qualification verification device according to Claim 9 is a use qualification verification device set forth in Claim 6 through 8, wherein the use qualification verification device includes a decryption part that, if use qualifications are acknowledged, decrypts information by using proof information or a value obtained from the proof information as a decryption key of the decryption part.

A use qualification verification device according to Claim 10 is a use qualification verification device set forth in Claim 6 through 9, wherein the use qualification verification device includes a history management part that manages a history of use qualification verifications, and a first proof support information management part manages transfer information together with proof support information, and challenge information further contains transfer information and the transfer information is stored in the history management part during use qualification verification.

[Operation]

A use qualification verification device of the present invention performs the issuance of proof support information and the verification of use qualifications.

In a use qualification verification device set forth in any claim, the parts operate as described below to issue proof support information.

The first communication part receives information for identifying what right to issue to which equipment having the private information memory part. If a use limitation description is made to limit the right by a time period or other items, the use limitation description is specified together at this time.

The private information management part, based on information to identify an equipment, searches for private information stored in the private information memory part of the equipment.

The proof information management part, based on information to identify a right, searches for proof information corresponding to the right. The first unidirectional function computation part, to at least the private information and the right identification information, applies a unidirectional function whose inverse function is at least computationally difficult to obtain. If a use limitation description exists, a unidirectional function is also applied to the use limitation description.

The proof support information computation part computes proof support information based on the proof information and a value resulting from the application of the unidirectional function.

The proof support information is sent from the first communication part and transferred to the communication part of relevant equipment, and stored in the proof support information management part of the relevant equipment.

The use qualification verification device according to Claim 1 verifies use qualifications as described below.

The challenge information computation part generates a random number and outputs the random number and right identification information stored in the proof information memory part together as challenge information.

The challenge information is transferred from the second communication part to the third communication part. The proof support information management part searches for proof support information corresponding to right identification information contained in the challenge information.

The third unidirectional function computation part, to private information stored in the private information memory part and the right identification information, applies a unidirectional function whose inverse function is at least computationally difficult to obtain.

The response information computation part performs operations on a computation result of the unidirectional function and the proof support information to obtain proof information. The third unidirectional function computation part, to the proof information and a random number of the challenge information, applies a unidirectional function whose inverse function is at least computationally difficult to obtain, thereby outputting response information.

The third communication part transfers response information to the second communication part.

The second unidirectional function computation part, to the proof information and a random number of the challenge information, applies a unidirectional function whose inverse function is at least computationally difficult to obtain.

The response information verification unit compares a result of the application of the unidirectional function with the response information, and acknowledges use qualifications if and only if they coincide.

The use qualification verification device according to Claim 2 verifies use qualifications as described below.

Prior to the verification of use qualifications, it is determined which right is to be verified, by inputting right identification information from the second communication part or performing computations according to predetermined rules.

The challenge information computation part generates a random number and outputs the random number and the right identification information together as challenge information.

The challenge information is transferred from the second communication part to the third communication part. The second proof support information management part searches for proof support information corresponding to right identification information contained in the challenge information.

The third unidirectional function computation part, to private information stored in the private information memory part and the right identification information, applies a unidirectional function whose inverse function is at least computationally difficult to obtain.

The response information computation part performs operations on a computation result of the unidirectional function and the proof support information to obtain proof information.

The third unidirectional function computation part, to the proof information and a random number of the challenge information, applies a unidirectional function whose inverse function is at least computationally difficult to obtain, thereby producing response information.

The third communication part transfers response information to the second communication part.

The second unidirectional function computation part, to private information stored in the private information memory part and the right identification information, applies a unidirectional function whose inverse function is at least computationally difficult to obtain.

The response information computation part performs operations on a computation result of the unidirectional function and the proof support information to obtain proof information.

The second unidirectional function computation part, to the proof information and a random number of the challenge information, applies a unidirectional function whose inverse function is at least computationally difficult to obtain.

The response information verification unit compares a result of the application of the unidirectional function with the response information, and acknowledges use qualifications if and only if they coincide.

In the use qualification verification device according to Claim 3, the verification of use qualifications is performed as described below.

This use qualification verification device has the same parts as the use qualification verification device according to Claim 1 or 2.

The proof support information management part managing proof support information used to compute response information manages a use limitation description together with proof support information, and when searching for proof support information from right identification information, searches for the use limitation description as well.

The third unidirectional function computation part, to the right identification information, the use limitation description, and private information stored in the private information memory part, applies a unidirectional function whose inverse function is at least computationally difficult to obtain.

The response information computation part performs operations on a computation result of the unidirectional function and the proof support information to obtain proof information. The third unidirectional function computation part, to the proof information, a random number of the challenge information, and the use limitation description, applies a unidirectional function whose inverse function is at least computationally difficult to obtain. The use limitation description and a value obtained here together are output as response information.

The response information verification part acknowledges use qualifications only when a value resulting from the application of the first unidirectional function computation part to the proof information, a random number of the challenge information, and the use limitation description of the response information equals to information other than the use limitation description of the response information, and the use limitation description satisfies given conditions. (An alternative method is for the response information computation part to determine whether the use limitation description satisfies given conditions.)

The use qualification verification device according to Claim 4 verifies use qualifications as described below.

This use qualification verification device has the same parts as the use qualification verification device according to Claim 1 through 3.

If use qualifications are acknowledged by the response information verification part, the decryption part decrypts information by using proof information or a value obtained from the proof information as a decryption key.

The use qualification verification device according to Claim 5 verifies use qualifications as described below.

This use qualification verification device has the same parts as the use qualification verification device according to Claim 1 through 4.

The proof information memory part or the first proof support information management part manages transfer information together with proof information or proof support information.

Challenge information further contains the transfer information.

The transfer information is stored in the history management part during use qualification verification.

The use qualification verification device according to Claim 6 verifies use qualifications as described below.

The first challenge information computation part generates a first random number and outputs at least the random number and right identification information stored in the proof information memory part together as challenge information.

The challenge information is transferred from the second communication part to the third communication part.

The second challenge information computation part generates a second random number and outputs it as second challenge information.

The third communication part transfers the second challenge information to the second communication part. The first response information computation part inputs at least the second challenge information to the second unidirectional function computation part and outputs information containing a value obtained here as first response information.

The first response information is transferred from the second communication part to the third communication part. The third unidirectional function computation part, to private information stored in the private information memory part and the right identification information, applies a unidirectional function whose inverse function is at least computationally difficult to obtain.

The proof support information management part searches for proof support information corresponding to right identification information contained in the challenge information.

The second response information computation part performs operations on a computation result of the unidirectional function and the proof support information to obtain proof information. Next, the first response information is compared with a value resulting from the application of the third unidirectional function computation part to the second challenge information and information containing the proof information.

If the value does not satisfy a given relation, a meaningless value is generated as second response information, and if the value satisfies the given relation, change of internal state and computation of response information are performed as described later.

The internal state management part searches for an internal state corresponding to the right identification information and changes the internal state in accordance with information obtained from the first challenge information or the first response information.

The third unidirectional function computation part, to the proof information and a first random number contained in the first challenge information, applies a unidirectional function whose inverse function is at least computationally difficult to obtain.

The second response information computation part outputs this value as second response information.

The third communication part transfers the response information to the second communication part.

The second unidirectional function computation part, to the proof information and a random number of the challenge information, applies a unidirectional function whose inverse function is at least computationally difficult to obtain.

The response information verification unit compares a result of the application of the unidirectional function with the response information, and acknowledges use qualifications if and only if they coincide.

The use qualification verification device according to Claim 7 verifies use qualifications as described below.

Prior to the verification of use qualifications, it is determined which right is to be verified, by inputting right identification information from the second communication part or performing computations according to predetermined rules.

The challenge information computation part generates a random number and outputs the random number and the right identification information together as challenge information.

The challenge information is transferred from the second communication part to the third communication part. The first proof support information management part searches for proof support information corresponding to right identification information contained in the challenge information.

The first challenge information computation part generates a first random number and outputs at least the random number and right identification information stored in the proof information memory part together as challenge information. The challenge information is transferred from the second communication part to the third communication part. The second challenge information computation part generates a second random number and outputs it as second challenge information.

The third communication part transfers second challenge information to the second communication part. The second unidirectional function computation part, to private information stored in the private information memory part and the right identification information, applies a unidirectional function whose inverse function is at least computationally difficult to obtain.

The first response information computation part performs operations on a computation result of the unidirectional function and the proof support information to obtain proof information.

The first response information computation part inputs at least the proof information and the second challenge information to the second unidirectional function computation part and outputs information containing a value obtained here as first response information.

The first response information is transferred from the second communication part to the third communication part. The third unidirectional function computation part, to private information stored in the private information memory part and the right identification information, applies a unidirectional function whose inverse function is at least computationally difficult to obtain.

The proof support information management part searches for proof support information corresponding to right identification information contained in the challenge information.

The second response information computation part performs operations on a computation result of the unidirectional function and the proof support information to obtain proof information. Next, the first response information is compared with a value resulting from the application of the third unidirectional function computation part to the second challenge information and information containing the proof information.

If the value does not satisfy a given relation, a meaningless value is generated as second response information, and if the value satisfies the given relation, change of internal state and computation of response information are performed as described later.

The internal state management part searches for an internal state corresponding to the right identification information and changes the internal state in accordance with information obtained from the first challenge information or the first response information.

The third unidirectional function computation part, to the proof information and a first random number contained in the first challenge information, applies a unidirectional function whose inverse function is at least computationally difficult to obtain.

The second response information computation part outputs this value as second response information.

The third communication part transfers the response information to the second communication part.

The second unidirectional function computation part, to the proof information and a random number of the challenge information, applies a unidirectional function whose inverse function is at least computationally difficult to obtain.

The response information verification unit compares a result of the application of the unidirectional function with the response information, and acknowledges use qualifications if and only if they coincide.

The use qualification verification device according to Claim 10 verifies use qualifications as described below.

This use qualification verification device has the same parts as the use qualification verification device according to Claim 6 through 9.

The proof information memory part or the first proof support information management part manages transfer information together with proof information or proof support information.

The first challenge information or the first response information further contains the transfer information.

The transfer information is stored in the history management part during use qualification verification.

DESCRIPTION OF THE PREFERRED EMBODIMENTS

Any of use qualification verification devices of embodiments described hereinafter comprises three elements: a proof support information issuance instrument, a verification instrument, and a proving instrument.

The proof support information issuance instrument issues proof support information used in the process of use qualification verification.

The verification instrument and the proving instrument perform interactive proof to verify the existence or absence of use qualifications. In the process of interactive proof, used are unidirectional functions such as MD5 and SHA whose computational complexity is much less than in the public key cryptosystem. In the embodiments described below, unidirectional functions with a plurality of arguments are used, but MD5 and SHA can be used by concatenating bit strings of the arguments.

The correspondences between the embodiments of user qualification verification devices described hereinafter and claims are as shown below, and the embodiments will be described with reference to a corresponding drawing. FIGS. 1 to 8 show the configuration of respective embodiments and FIGS. 9 and 10 show operations.

Figure 1:
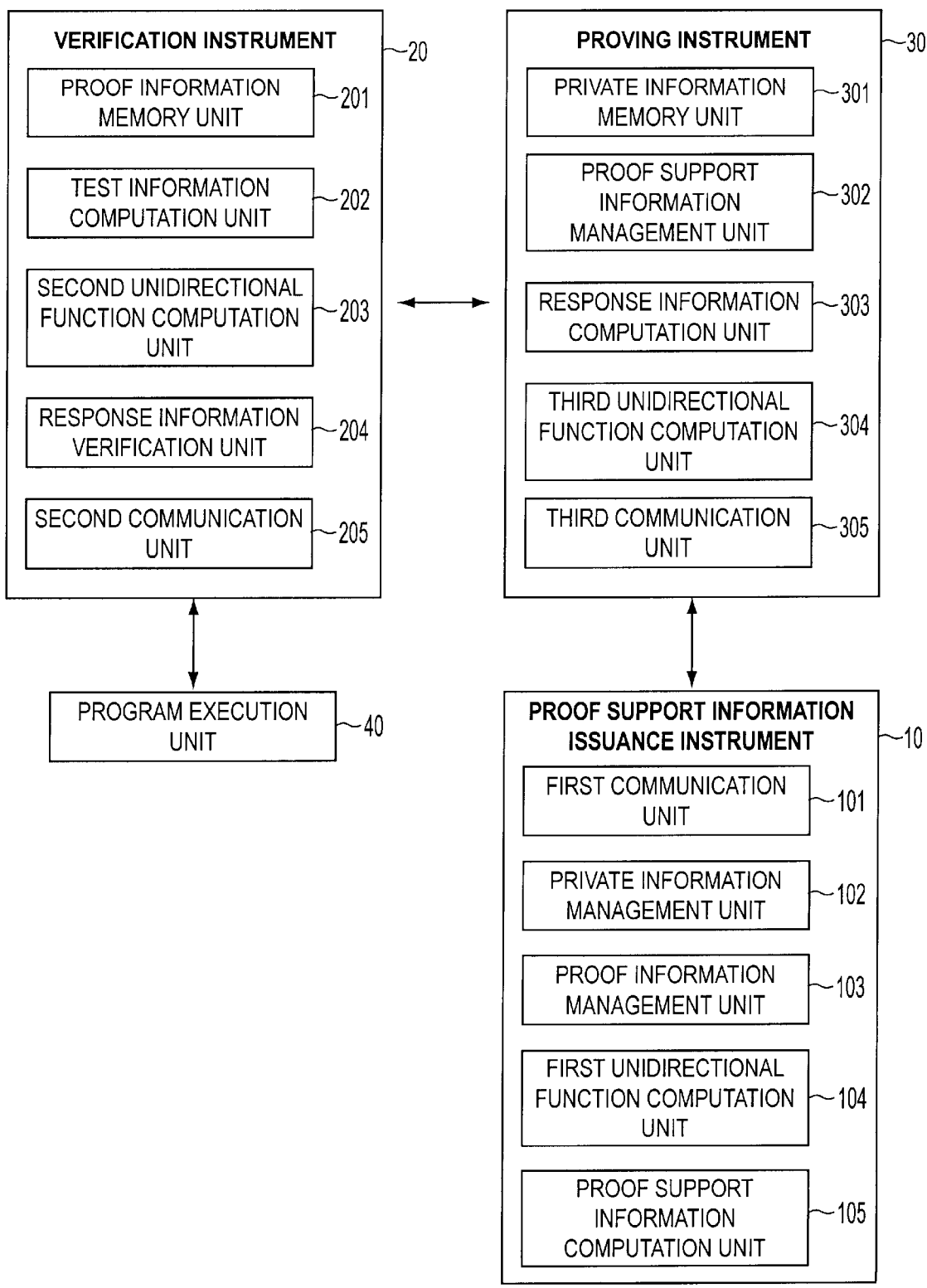
FIG. 1 is a block diagram showing the configuration of a first embodiment of the present invention.
Figure 2:
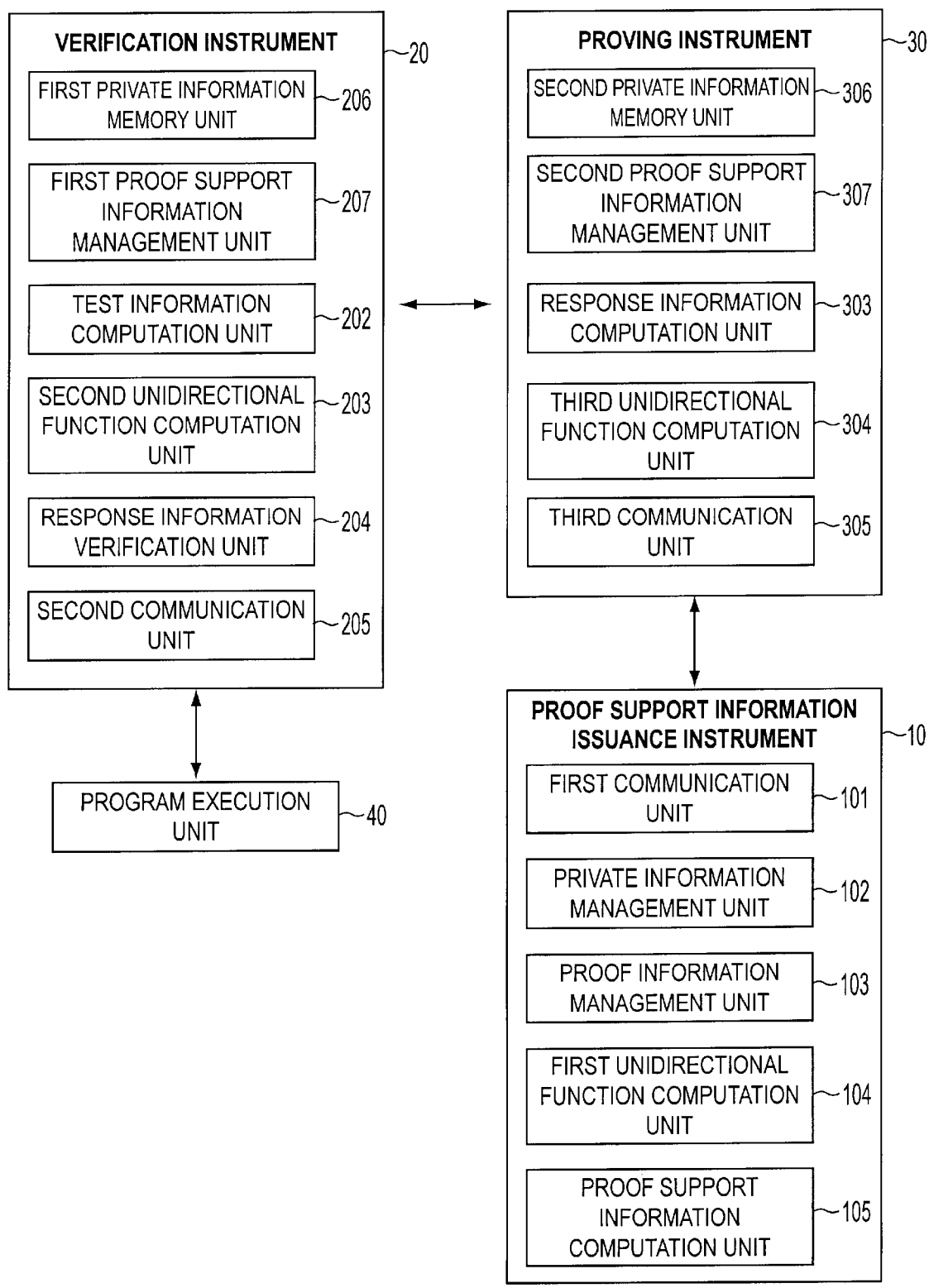
FIG. 2 is a block diagram showing the configuration of a second and a third embodiments of the present invention.
Figure 3:
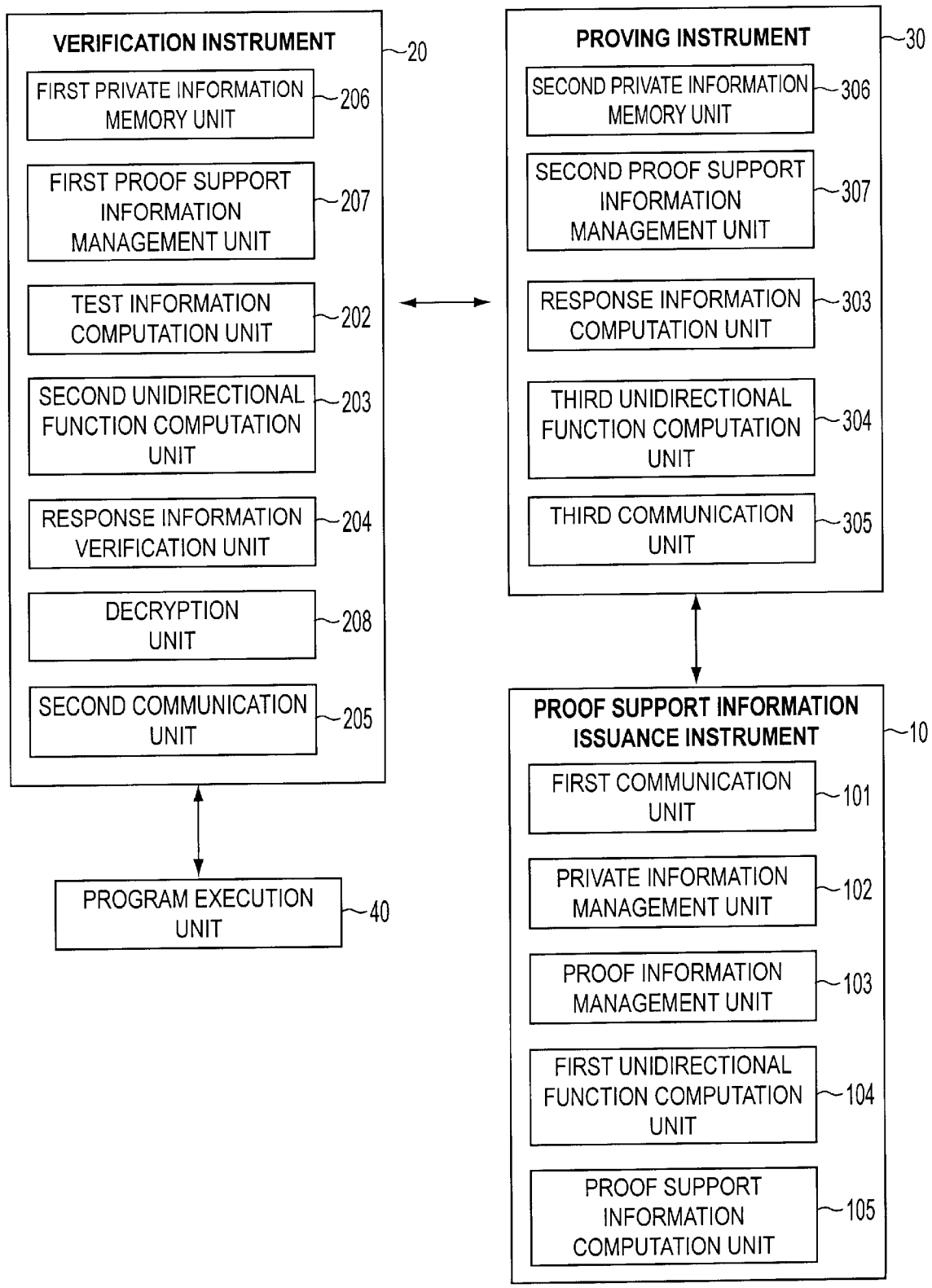
FIG. 3 is a block diagram showing the configuration of a fourth embodiment of the present invention.
Figure 4:
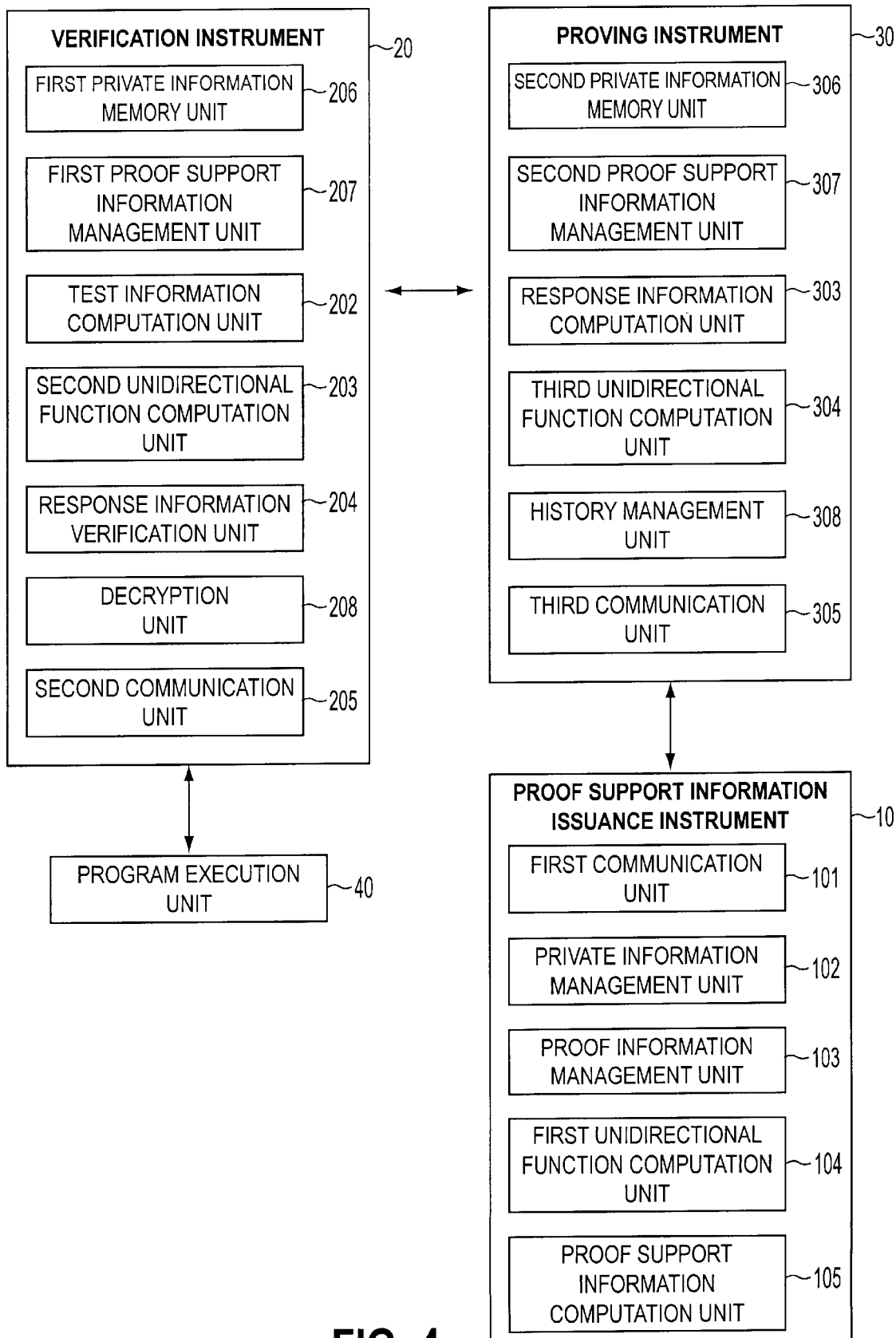
FIG. 4 is a block diagram showing the configuration of a fifth embodiment of the present invention.
Figure 5:
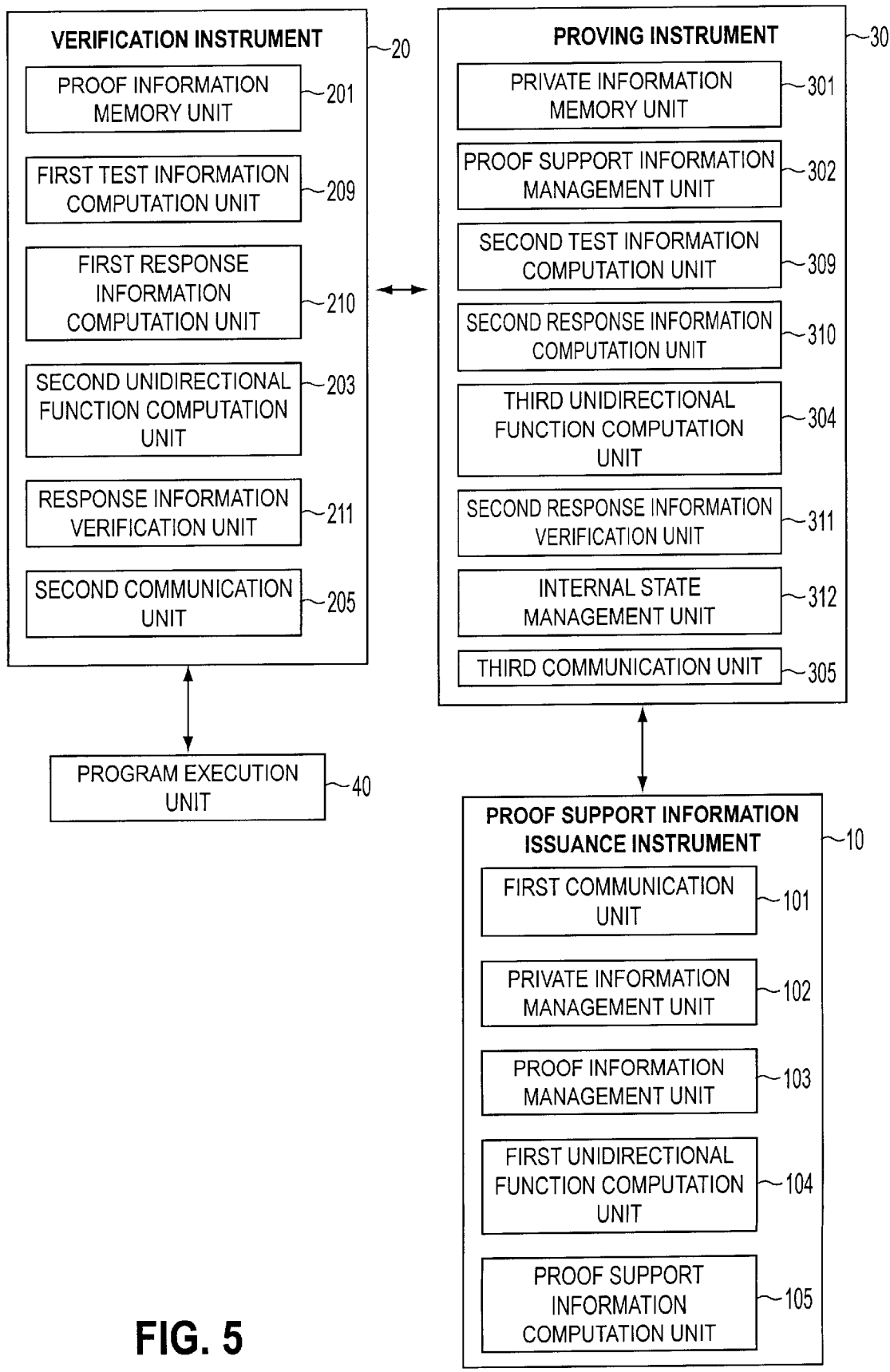
FIG. 5 is a block diagram showing the configuration of a sixth embodiment of the present invention.
Figure 6:
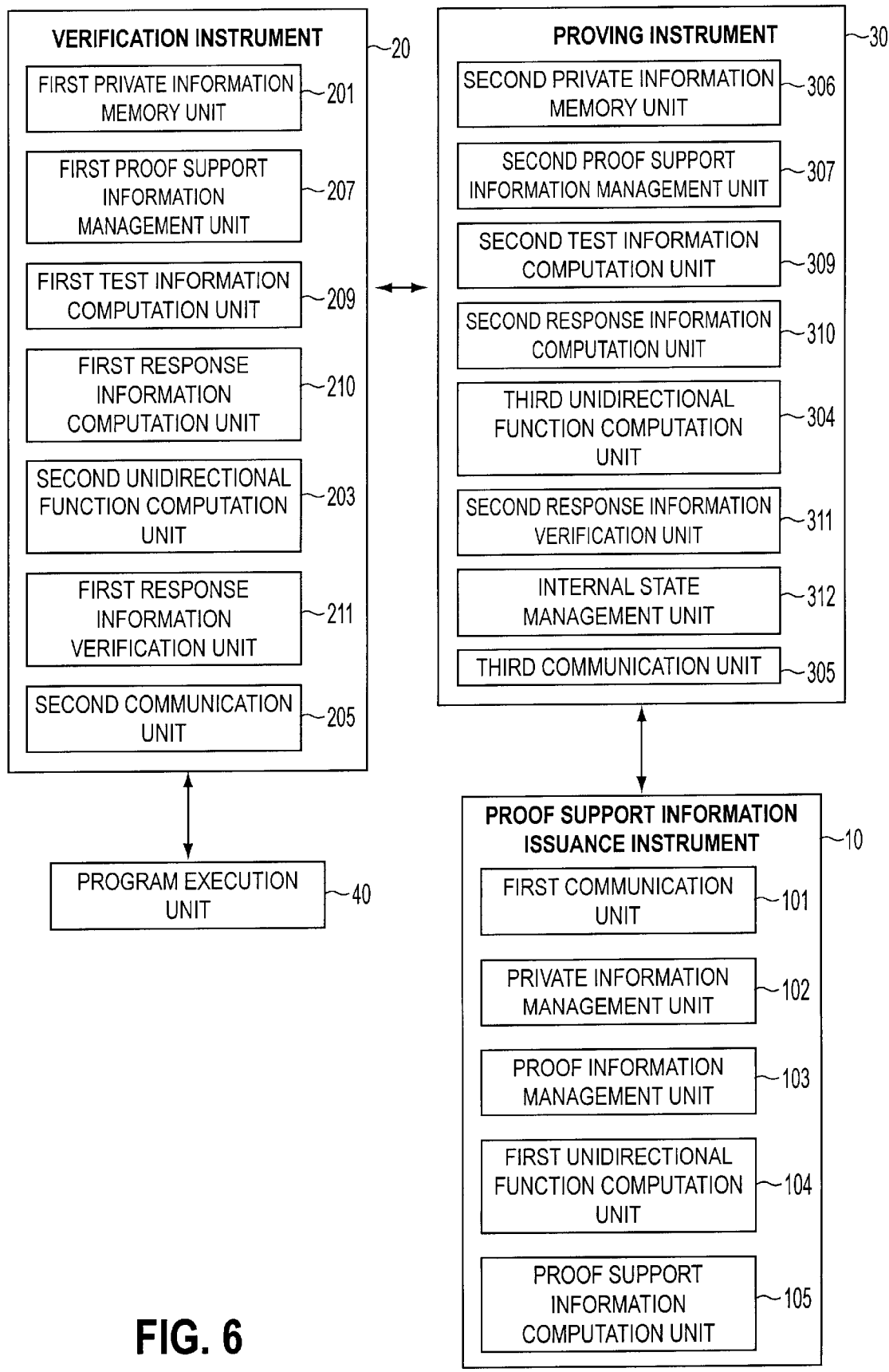
FIG. 6 is a block diagram showing the configuration of a seventh and an eight embodiments of the present invention.
Figure 7:
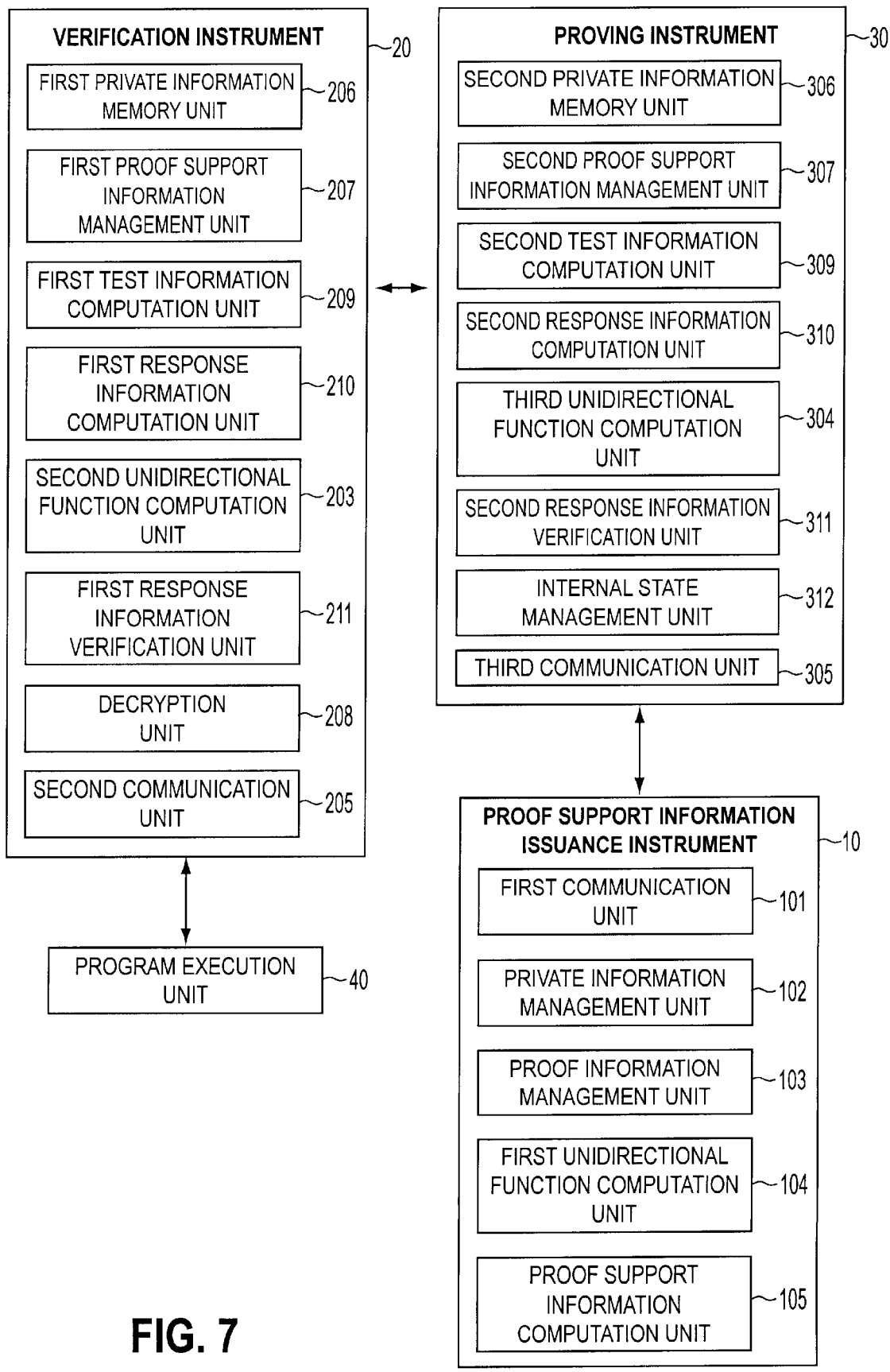
FIG. 7 is a block diagram showing the configuration of a ninth embodiment of the present invention.
Figure 8:
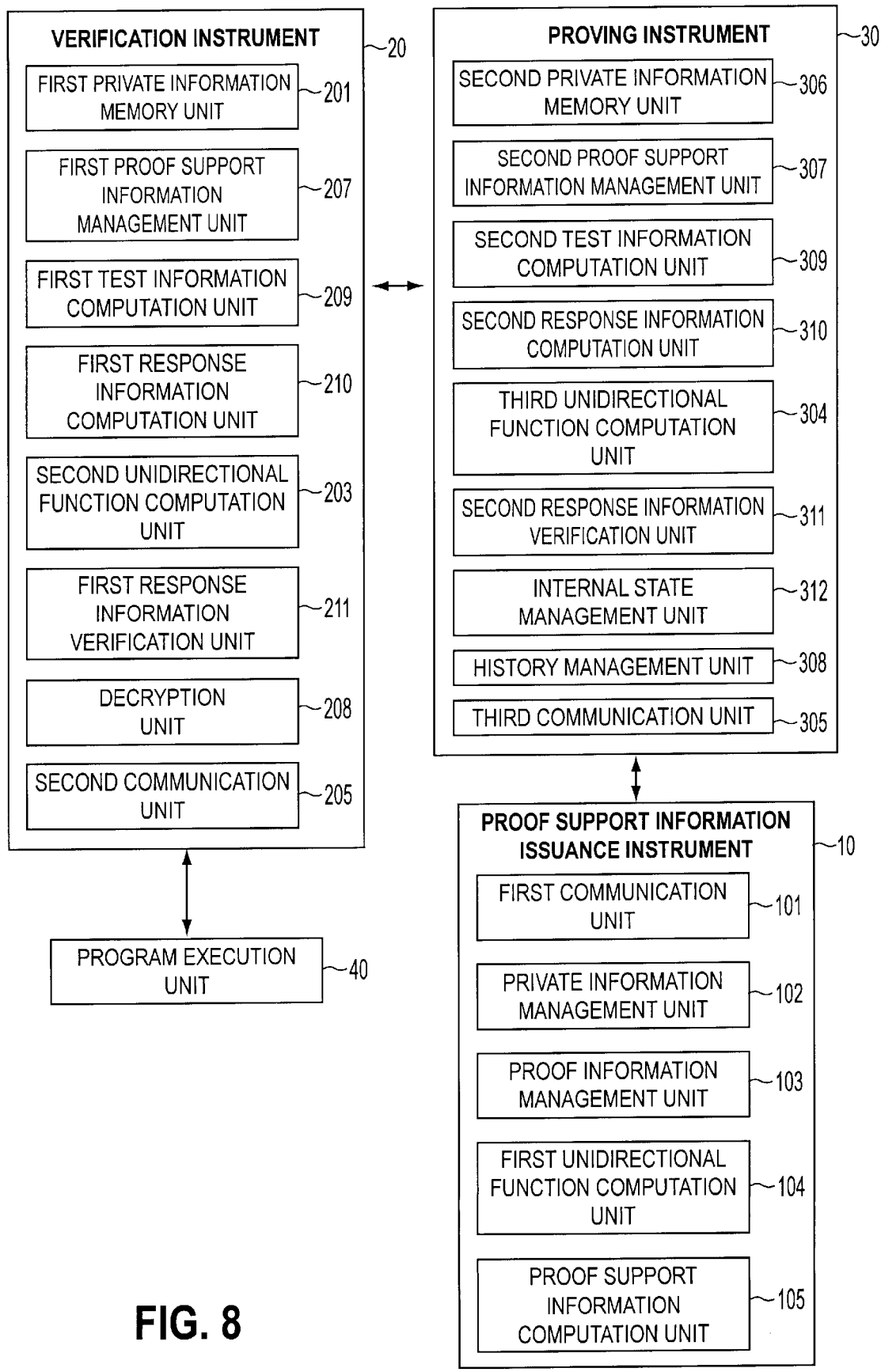
FIG. 8 is a block diagram showing the configuration of a tenth embodiment of the present invention.
Figure 9:
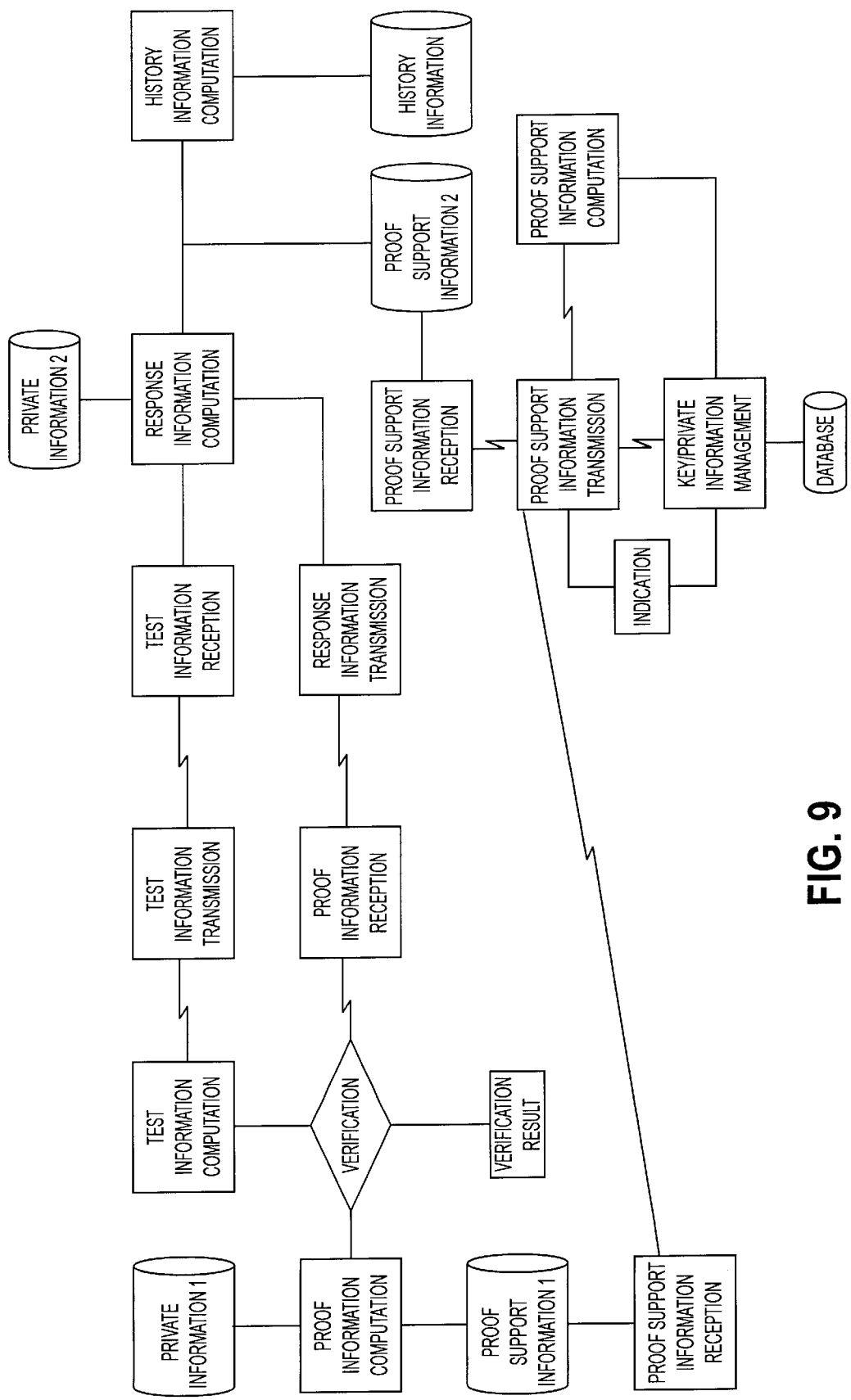
FIG. 9 is a diagram for explaining the overall operation of the fifth embodiment of the present invention.
Figure 10:
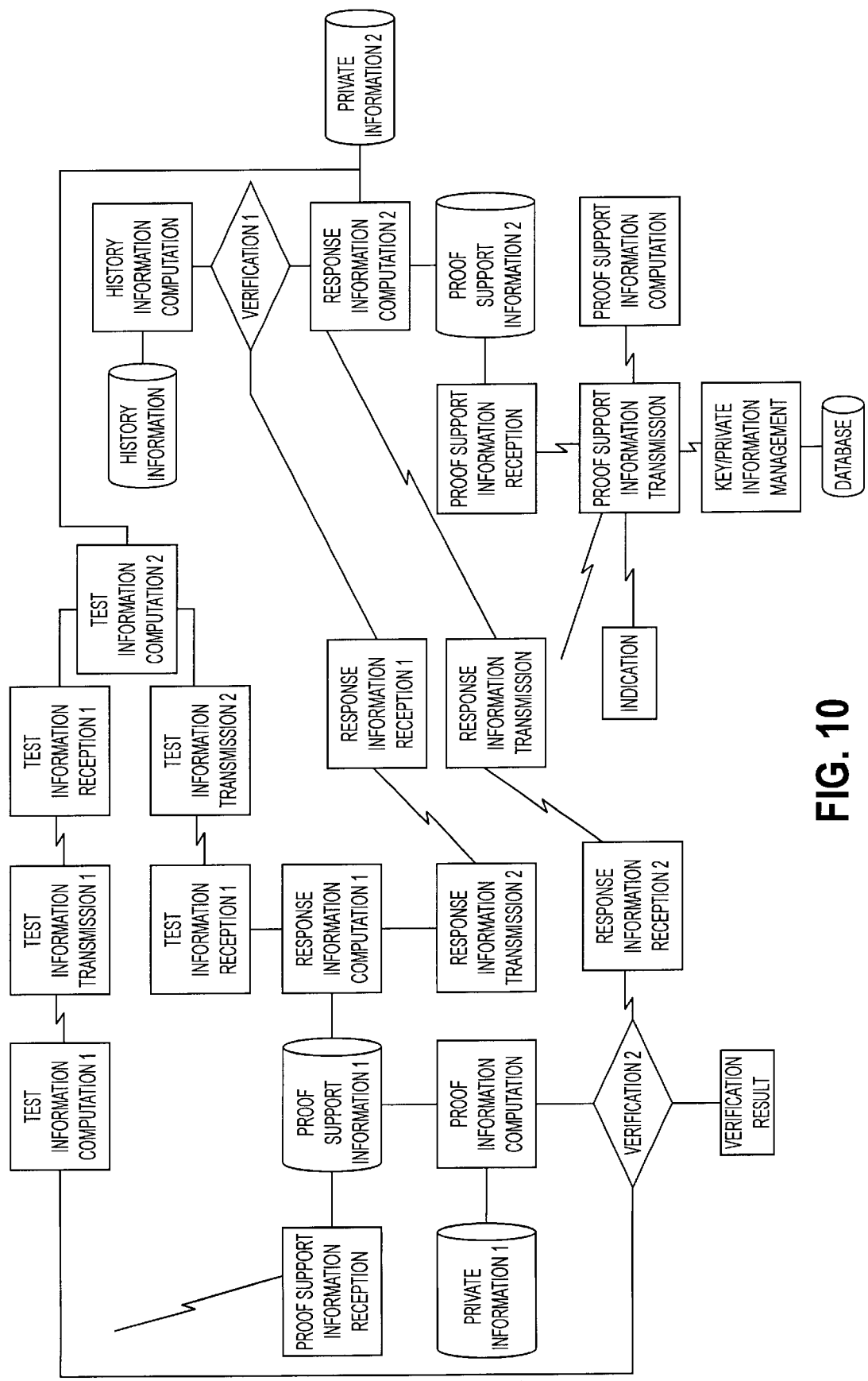
FIG. 10 is a diagram for explaining the overall operation of the tenth embodiment of the present invention.

[Table 1]
First embodiment Claim 1 FIG. 1
Second embodiment Claim 2 FIG. 2
Third embodiment Claim 3 FIG. 2
Fourth embodiment Claim 4 FIG. 3
Fifth embodiment Claim 5 FIGS. 4 and 9
Sixth embodiment Claim 6 FIG. 5
Seventh embodiment Claim 7 FIG. 6
Eighth embodiment Claim 8 FIG. 6
Ninth embodiment Claim 9 FIG. 7
Tenth embodiment Claim 10 FIGS. 8 and 10

[First Embodiment]

A first embodiment will be described hereinafter. This embodiment performs basic interactive authentication using a unidirectional function.

FIG. 1 shows the configuration of the first embodiment. In this figure, a use qualification verification device includes a proof support information issuance instrument 10, a verification instrument 20, and a proving instrument 30. The proof support information issuance instrument 10 issues proof support information to the proving instrument 20. The proving instrument 30 uses the proof support information to perform interactive authentication with the proving instrument 20. If the authentication succeeds, a program execution unit 40, for example, executes a program.

The proof support information issuance instrument 10 includes a first communication unit 101, a private information management unit 102, a proof information management unit 103, a first unidirectional computation unit 104, and a proof support information computation unit 105.

Figure 11:
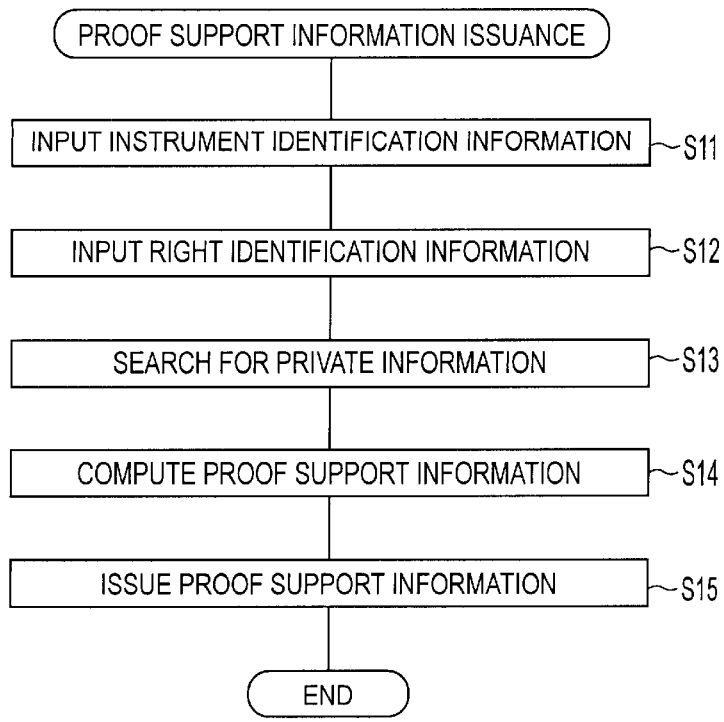
FIG. 11 is a flowchart for explaining the operation of a proof support information issuance instrument of the first embodiment of the present invention.

The flow of processing of the proof support information issuance instrument 10 is shown in FIG. 11.

The proof support information issuance instrument 10 issues proof support information based on a request from the proving instrument 30. The first communication unit 101, from the proving instrument 30, receives identification information of the proving device 30 and information for identifying what right to issue (S11 and S12 of FIG. 1). The private information management unit 102 searches for private information held by the proving device 30 from the information for identifying the proving device 30 (S13). The proof information management unit 103, from the information for identifying the right, searches for proof information (K) corresponding to the right. The first unidirectional computation unit 104, to at least the private information and the right identification information, applies a unidirectional function whose inverse function is at least computationally difficult to obtain. The proof support information computation unit 105 computes proof support information based on the proof information and a value resulting from the application of the unidirectional function (S14). The proof support information is sent from the first communication unit 101 to the proving instrument 30 (S15).

The proving instrument 20 includes a proof information memory unit 201, a challenge information computation unit 202, a second unidirectional function computation unit 203, a response information verification instrument 204, and a second communication unit 205.

The proving instrument 20 sends challenge information to the proving instrument 30 and verifies proof information returned from the proving instrument 30 to perform interactive authentication with the proving device.

Figure 12:
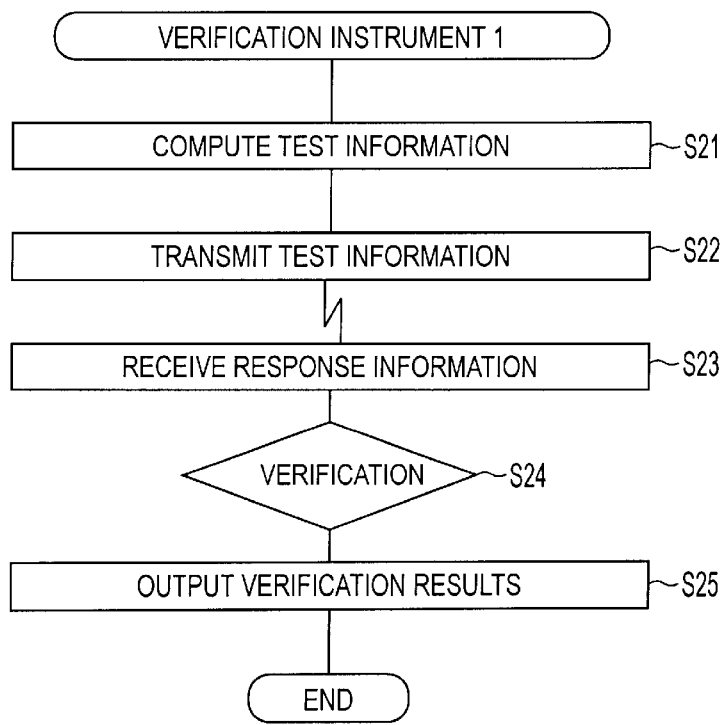
FIG. 12 is a flowchart for explaining the operation of a verification instrument of the first embodiment of the present invention.

The flow of processing of the verification instrument 20 is shown in FIG. 12.

The proof information memory unit 201 stores right identification information. The challenge information computation unit 202 generates a random number and outputs the random number and right identification information stored in the proof information memory unit 201 together as challenge information (S21 of FIG. 12). The challenge information is transferred from the second communication unit 205 to a third communication unit 305 of the proving instrument 30 (S22). The second communication unit 205 receives response information returned from the proving instrument 30 (S23). Th e second unidirectional function computation part 203, to the proof information and a random number of the challenge information, applies a unidirectional function whose inverse function is at least computationally difficult to obtain. The response information verification instrument 204 compares a result of the application of the unidirectional function with the response information, and acknowledges use qualifications if and only if they coincide (S24 and S25).

The proving instrument 30 comprises a private information memory unit 301, a proof support information management unit 302, a response information computation unit 303, a third unidirectional function computation unit 304, and a third communication unit 305.

The proving instrument 30 performs predetermined calculations on challenge information sent from the verification instrument 20 to generate response information and returns it to the verification instrument 20.

Figure 13:
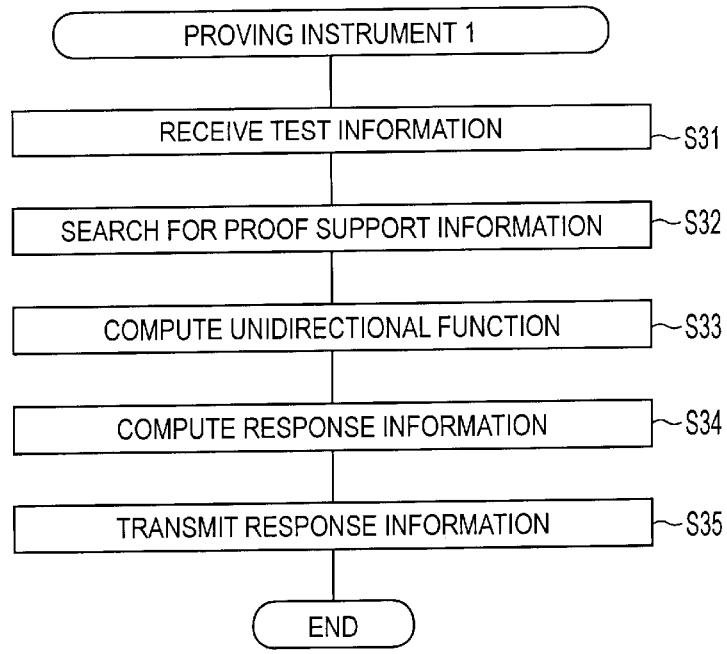
FIG. 13 is a flowchart for explaining the operation of a proving instrument of the first embodiment of the present invention.

The flow of processing of the proving instrument 30 is shown in FIG. 13.

The challenge information is transferred from the second communication unit 205 to the third communication unit 305 (S31).

The private information memory unit 301 stores private information specific to the proving instrument 30. The proof support information management unit 302 searches for proof support information corresponding to right identification information contained in the challenge information (S32). The proof support information is obtained in advance from the proof support information issuance instrument 10. The third unidirectional function computation unit 304, to private information stored in the private information memory unit 301 and the right identification information contained in the challenge information, applies a unidirectional function whose inverse function is at least computationally difficult to obtain (S33). The response information computation unit 303 performs operations on a computation result of the unidirectional function and the proof support information to obtain proof information. Furthermore, the third unidirectional function computation unit 304, to the proof information and a random number contained in the challenge information, applies a unidirectional function whose inverse function is at least computationally difficult to obtain, to generate response information. The response information is sent to the second communication unit 205 of the verification instrument 20 via the third communication unit 305 (S34 and S35).

Hereinafter, a detailed description will be made of an authentication protocol of the first embodiment.

In the first embodiment, proof support information t is defined as described below.

$$t=K-f(d, n) \quad \text{[Expression 1]}$$

where K is proof information, f is a unidirectional function, d is private information, and n is information for identifying the right to be verified. Challenge information C sent from the verification instrument 20 to the proving instrument 30 satisfies the expression below, where r is a random number.

$$C=(n, r) \quad \text{[Expression 2]}$$

The proving instrument 30 obtains response information R by a computation shown below.

$$R=f(t+f(d, n), r) \quad \text{[Expression 3]}$$

When the proving instrument 30 holds correct proof support information t, $$t+f(d, n)=K-f(d, n)+f(d, n)=K \quad \text{[Expression 4]}$$

holds, and proof information K can be restored, and $$R=f(K, r) \quad \text{[Expression 5]}$$

holds.

The verification instrument 20 obtains f(K, r) and compares it with the response information R, and the proving instrument acknowledges use qualifications if and only if they coincide.

[Second Embodiment]

Next, a second embodiment will be described. In this embodiment, there are a plurality of rights to be authenticated and arrangements are made to determine in advance which right is to be authenticated. Which right to authenticate is determined by inputting right identification information or performing computations in accordance with predetermined rules. An authentication method by use of a unidirectional function is basically the same as that in the first embodiment.

FIG. 2 shows the configuration of the second embodiment. In this figure, locations corresponding to those in FIG. 1 are assigned corresponding reference numerals.

The proof support information issuance instrument 10 of this embodiment issues proper proof support information in response to a request from the verification instrument 10 and the proving instrument 20.

The verification instrument 20 includes a first private information memory unit 206 and a first proof support information management unit 207. The proving instrument 30 includes a second private information memory unit 306 and a second proof support information management unit 307.

Prior to the verification of use qualifications, right identification information is inputted via the second communication unit 205 and it is determined which right is to be verified. This determination may also be made by performing computations in accordance with rules determined in advance.

The challenge information computation unit 202 generates a random number and outputs the random number and right identification information together as challenge information. The challenge information is transferred from the second communication unit 205 to the third communication unit 305 of the proving instrument 30.

The second proof support information management unit 307 of the proving instrument 30 searches for proof support information corresponding to right identification information contained in the challenge information. The third unidirectional function computation unit 304, to private information stored in the second private information memory unit 306 and the right identification information, applies a unidirectional function whose inverse function is at least computationally difficult to obtain. Furthermore, the response information computation unit 303 performs operations on a computation result of the unidirectional function and the proof support information to obtain proof information. The third unidirectional function computation unit 304, to the proof information and a random number contained in the challenge information, further applies a unidirectional function whose inverse function is at least computationally difficult to obtain, to generate response information. The response information is sent to the verification instrument 20 via the third communication unit 305 and the second communication unit 205.

The second unidirectional function computation unit 203 of the verification instrument 20, to private information stored in the first private information memory unit 206 and right identification information, applies a unidirectional function whose inverse function is at least computationally difficult to obtain. Proper operations are performed on a computation result of the unidirectional function and the proof support information to obtain proof information. The second unidirectional function computation unit 203, to the proof information and a random number contained in the challenge information, further applies a unidirectional function whose inverse function is at least computationally difficult to obtain. The response information verification instrument 204 compares a result of the application of the unidirectional function with the response information, and acknowledges use qualifications if and only if they coincide.

Next, a detailed description will be made of an authentication protocol of the second embodiment.

In the second embodiment, proof support information tv of a verification instrument and proof support information tp of a proving instrument are defined as shown below.

$$tv=K-f(dv, n)$$
$$tp=K-f(dp, n) \quad \text{[Expression 6]}$$

where K is proof information, f is a unidirectional function, dv is private information of the verification instrument 20, dp is private information of the proving instrument 30, and n is information for identifying the right to be verified.

Challenge information C sent from the verification instrument 20 to the proving instrument 30 satisfies the expression below, where r is a random number.

$$C=(n, r) \quad \text{[Expression 7]}$$

The proving instrument 30 obtains response information R by a computation shown below.

$$R=f(tp+f(dp, n), r) \quad \text{[Expression 8]}$$

When the proving instrument 30 holds correct proof support information tp, $$tp+f(dp, n)=K-f(dp, n)+f(dp, n)=K \quad \text{[Expression 9]}$$

holds, and proof information K can be restored, and $$R=f(K, r) \quad \text{[Expression 10]}$$

holds.

The verification instrument 20 computes tv+f(dv, n) to obtain K. Next, it calculates f (K, r) and compares the result with R, and if and only if they coincide, the proving instrument acknowledges use qualifications.

[Third Embodiment]

Next, a third embodiment will be described. This embodiment is the same as the second embodiment, except that use limitations are introduced.

The configuration of the third embodiment is the same as that of the second embodiment, which is as shown in FIG. 2.

Hereinafter, a description will be made of an authentication protocol of the third embodiment.

In the third embodiment, proof support information tv of the verification instrument 20 and proof support information tp of the proving instrument 30 are defined as shown below.

$$tv=K-f(dv, n)$$

$$tp=K-f(dp, n, L) \quad \text{[Expression 11]}$$

where K is proof information, f is a unidirectional function, dv is private information of the verification instrument 20, dp is private information of the proving instrument 30, n is information for identifying the right to be verified, and L is a use limitation description. The use limitation description L consists of a bit string representing, e.g., the expiration of a use period.

Challenge information C sent from the verification instrument 20 to the proving instrument 30 satisfies the expression below, where r is a random number.

$$C=(n, r) \quad \text{[Expression 12]}$$

The proving instrument 30 obtains response information R by a computation shown below.

$$R=(L, f(tp+f(dp, n, L), r, L)) \quad \text{[Expression 13]}$$

When the proving instrument 30 holds correct proof support information tp, $$tp+f(dp, n, L)=K-f(dp, n, L)+f(dp, n, L)=K \quad \text{[Expression 14]}$$

holds, and proof information K can be restored, and $$R=(L, f(K, r, L)) \quad \text{[Expression 15]}$$

holds.

The verification instrument 20 computes tv+f(dv, n) and obtains K. Next, it obtains f(K, r) and compares it with R, and if and only if they coincide and the use limitation description L satisfies use conditions, the proving instrument 30 acknowledges use qualifications.

Although, in this embodiment, it is determined by the verification instrument 20 whether the use limitation description L satisfies use conditions, the proving instrument 30 may also be substituted for the verification instrument 20. In this case, the use limitation description L may not be included in response information.

[Fourth Embodiment]

Next, a fourth embodiment will be described. This embodiment uses the proof information K or a value derived therefrom as a key to decrypt encrypted information.

FIG. 3 shows the configuration of the fourth embodiment. In this figure, locations corresponding to those in FIG. 2 are assigned corresponding reference numerals. In this embodiment, the verification instrument 20 is provided with a decryption unit 208.

The fourth embodiment is the same as the third embodiment in information handled and a verification procedure. The decryption unit 208 of the verification instrument 20, if the proving instrument 30 acknowledges use qualifications, uses the proof information K or a value computable using K as a key to decrypt encrypted information.

[Fifth Embodiment]

Next, a fifth embodiment will be described. This embodiment is arranged to make a use history manageable.

FIG. 4 shows the configuration of the fifth embodiment. In this figure, locations corresponding to those in FIG. 3 are assigned corresponding reference numerals. In FIG. 4, the proving instrument 30 is provided with a history management unit 308.

Hereinafter, a description will be made of an authentication protocol of the fifth embodiment.

The authentication procedure is shown in FIG. 9. The operations in the first to fourth embodiments, which are contained in the fifth embodiment, will be understood from FIG. 9.

Hereinafter, a detailed description will be made of an authentication protocol of the fifth embodiment.

In the fifth embodiment, proof support information tv of the verification instrument 20 and proof support information tp of the proving instrument 30 are defined as shown below.

$$tv=K-f(dv, n)$$

$$tp=K-f(dp, n, L) \quad \text{[Expression 16]}$$

where K is proof information, f is a unidirectional function, dv is private information of the verification instrument 20, dp is private information of the proving instrument 30, n is information for identifying the right to be verified, and L is a use limitation description. The use limitation description L consists of a bit string representing, e.g., the expiration of a use period.

The verification instrument 20 computes tv+f(dv, n) to obtain K.

Challenge information C sent from the verification instrument 20 to the proving instrument 30 satisfies the expression below, where r is a random number.

$$C=(n, I, r, s) \quad \text{[Expression 17]}$$

where I is information transferred from the verification instrument 20 to the proving instrument 30 and s is a value derived from the following expression.

$$s=f(K, I, r) \quad \text{[Expression 18]}$$

The proving instrument 30 obtains K' from a computation shown below.

$$K'=tp+f(dp, n, L) \quad \text{[Expression 19]}$$

Next, the proving instrument 30 computes f(K', I, r) and compares the result with s. If and only if they coincide, information containing I is stored in the history memory unit 308.

The proving instrument 30 further obtains response information R.

$$R=(L, f(tp+f(dp, n, L), r, L)) \quad \text{[Expression 20]}$$

When the proving instrument 30 holds correct proof support information tp, we get $$tp+f(dp, n, L)=K-f(dp, n, L)+f(dp, n, L)=K \quad \text{[Expression 21]}$$

and proof information K can be restored, and we get $$R=(L, f(K, r, L)) \quad \text{[Expression 22]}$$

The verification instrument computes f(K, r) and compares an obtained value with R, and if and only if they coincide and L satisfies the use conditions, the proving instrument acknowledges use qualifications.

Although, in this embodiment, it is determined by the verification instrument 20 whether the use limitation description L satisfies use conditions, the proving instrument 30 may also be substituted for the verification instrument 20.

[Sixth Embodiment]

Next, a sixth embodiment will be described. The sixth embodiment allows the internal state of the proving instrument to be changed by mutual authentication.

FIG. 6 shows the configuration of the sixth embodiment. In this figure, locations corresponding to those in FIG. 1 are assigned corresponding reference numerals. In FIG. 6, the verification instrument 20 is provided with a first challenge information computation unit 209, a first response information computation unit 210, and a first response information verification instrument 211, and the proving instrument 30 is provided with a second challenge information computation unit 309, a second response information computation unit 310, a second response information verification instrument 311, and an internal state management unit 312.

In this embodiment, both the verification instrument 20 and the proving instrument 30 perform authentication; the former performs decryption and the latter changes internal states in accordance with the decryption and other processing.

Figure 14:
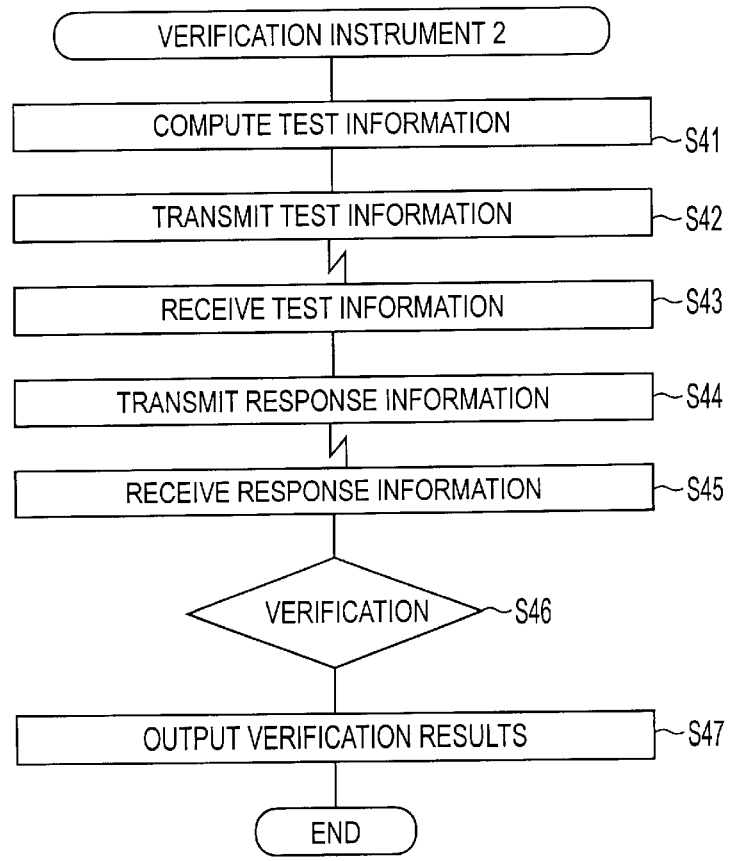
FIG. 14 is a flowchart for explaining the operation of a verification instrument of the sixth embodiment of the present invention.
Figure 15:
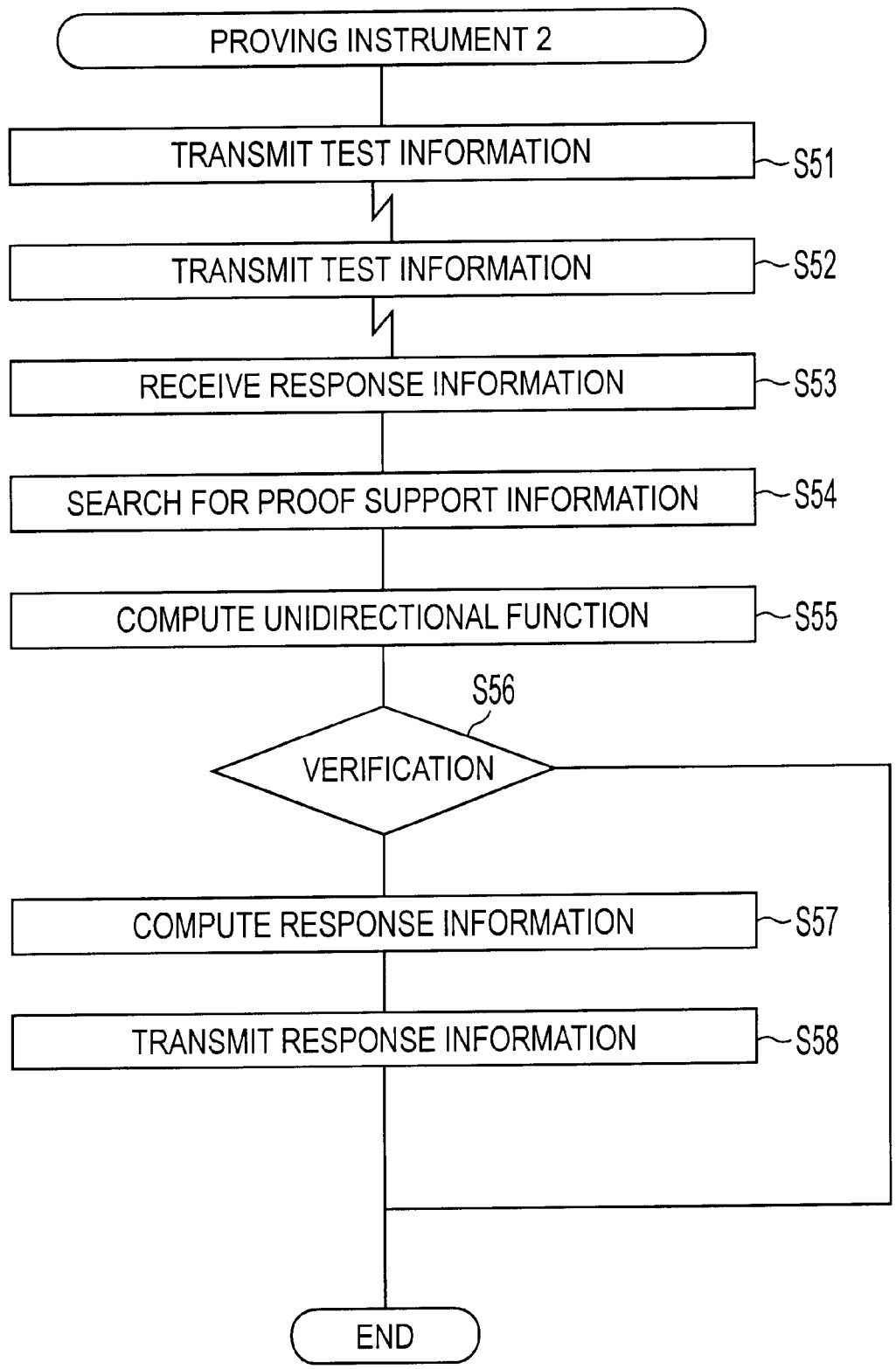
FIG. 15 is a flowchart for explaining the operation of a proving instrument of the first embodiment of the present invention.

The flows of processing of the verification instrument 20 and the proving instrument 30 are shown in FIGS. 14 and 15, respectively.

The first challenge information computation unit 209 of the verification instrument 20 generates a first random number and outputs at the least the first random number and right identification information stored in the proof information memory unit 201 together as challenge information (S41 of FIG. 14). The challenge information is transferred from the second communication unit 205 to the third communication unit 305 of the proving instrument 30 (S42 of FIG. 14 and S51 of FIG. 15).

On the other hand, the second challenge information computation unit 309 generates a second random number, generates it as second challenge information, and sends it to the verification instrument 20 (second communication unit 205) via the third communication unit 305 (S52 and S43).

The first response information computation unit 210 of the verification instrument 20 inputs at least the second challenge information and the information transferred from the verification instrument.20 to the proving instrument 30 to the second unidirectional function computation unit 203, and generates first response information so as to contain a value obtained herein and information itself to be transferred. The first response information is transferred from the second communication unit 205 to the third communication unit 305 of the proving instrument 30 (S44 and S53).

The third unidirectional function computation unit 304 of the proving instrument 30, to private information stored in the private information memory unit 301 and the right identification information, applies a unidirectional function whose inverse function is at least computationally difficult to obtain.

The proof support information management unit 302 searches for proof support information corresponding to right identification information contained in the challenge information (S54).

The second response information computation unit 310 performs operations on a computation result of the unidirectional function and the proof support information to obtain proof information. Next, the third unidirectional function computation unit 304 is applied to the second challenge information and information containing the proof information, and a value obtained as a result and the first response information (a part of it) are compared (S55 and S56). If the value does not satisfy a given relation, a meaningless value is generated as second response information, and if the value satisfies the given relation, change of internal state and computation of response information are performed as described later.

The internal state management unit 312 searches for an internal state corresponding to the right identification information and changes the internal state in accordance with information obtained from the first challenge information or the first response information.

The third unidirectional function computation unit 304, to the proof information and a first random number contained in the first challenge information, applies a unidirectional function whose inverse function is at least computationally difficult to obtain, and the second response information computation unit 311 outputs this value as second response information. The third communication unit 305 transfers the second response information to the communication unit 205 of the second verification instrument 20 (S57, S58, and S45).

The second unidirectional function computation unit 203 of the verification instrument 20, to the proof information and a random number of the challenge information, applies a unidirectional function whose inverse function is at least computationally difficult to obtain. The first response information verification instrument 211 compares a result of the application of the unidirectional function with the second response information, and acknowledges use qualifications if and only if they coincide (S46 and S47).

Hereinafter, a detailed description will be made of an authentication protocol of the sixth embodiment.

In the sixth embodiment, proof support information t is defined as described below.

$$t=K-f(d, n) \quad \text{[Expression 23]}$$

K is proof information, f is a unidirectional function, d is private information, and n is information for identifying the right to be verified.

First challenge information C1 sent from the verification instrument 20 to the proving instrument 30 satisfies the expression below, where r1 is a random number.

$$C1=(n, r1) \quad \text{[Expression 24]}$$

The proving instrument 30 sends the second challenge information C2 to the verification instrument 20.

$$C2=r2 \quad \text{[Expression 25]}$$

where r2 is a random number.

The verification instrument 20 sends the first response information R1 to the proving instrument 30.

$$R1=(m, f(K, r2, m))\quad\text{[Expression 26]}$$

where m is information transferred from the verification instrument 20 to the proving instrument 30. m is, e.g., an amount charged for each use.

The proving instrument 30 obtains K' by the computation shown below.

$$K'=tp+f(dp, n)\quad\text{[Expression 27]}$$

When the proof support information tp is correct, K' agrees with the proof information K.

The proving instrument 30 computes f(K', r2, m) and compares an obtained value with the second term of R1. When they coincide, it changes an internal state corresponding to the right to be verified in accordance with information m transferred the verification instrument 20. For example, if m is an amount charged for each use, a prepaid amount is subtracted by the corresponding amount.

Next, the proving instrument 30 obtains second response information R2.

$$R2=f(K', r1)\quad\text{[Expression 28]}$$

When the proving instrument holds correct proof support information tp, K' matches the proof information K and we get.

$$R2=f(K, r)\quad\text{[Expression 29]}$$

The verification instrument 20 obtains f(K, r) and compares it with R2, and the proving instrument 30 acknowledges use qualifications if and only if they coincide.

[Seventh Embodiment]

Next, a seventh embodiment will be described. In this embodiment, there are a plurality of rights to be authenticated and arrangements are made to determine in advance which right is to be authenticated. Which right to authenticate is determined by inputting right identification information or performing computations in accordance with predetermined rules. Other portions of the configuration are the same as those in the sixth embodiment.

The verification instrument 20 of this embodiment is provided with the first private information memory unit 206 and the first proof support information management unit 207, in addition to the configuration of the sixth embodiment (FIG. 5). The proving instrument 30 includes the second private information memory unit 306 (the private information memory unit 301 of FIG. 5) and the second proof support information management unit 307 (the private information memory unit 302 of FIG. 5). In FIG. 6, locations corresponding to those in FIG. 5 are assigned corresponding reference numerals.

The proof support information issuance instrument 10 of this embodiment issues proper proof support information in response to a request respectively from the verification instrument 10 and the proving instrument 20.

Prior to the verification of use qualifications, the proof support information issuance instrument 10 determines which right to verify by inputting right identification information from the second communication unit 205 or by performing computations in accordance with rules determined in advance.

The first proof support information management unit 207 of the verification instrument 20 searches for proof support information corresponding to right identification information contained in the challenge information.

The first challenge information computation unit 209 generates a first random number and outputs at least the random number and right identification information together as challenge information. The challenge information is transferred from the second communication unit 205 to the third communication unit 305 of the proving instrument 30.

The second challenge information computation unit 309 of the proving instrument 30 generates a second random number and outputs it as second challenge information. The third communication unit 305 transfers the second challenge information to the second communication unit 205 of the verification instrument 20.

The second unidirectional function computation unit 203 of the verification instrument 20, to private information stored in the private information memory unit 206 and the right identification information, applies a unidirectional function whose inverse function is at least computationally difficult to obtain.

The first response information computation unit 210 performs operations on a computation result of the unidirectional function and the proof support information to obtain proof information. The first response information computation unit 210 inputs at least the second challenge information and the information transferred from the verification instrument 20 to the proving instrument 30 to the second unidirectional function computation unit and generates first response information so as to contain a value obtained herein and information itself to be transferred. The first response information is transferred from the second communication unit 205 to the third communication unit 305.

The third unidirectional function computation unit 304 of the proving instrument 30, to private information stored in the second private information memory unit 206 and the right identification information, applies a unidirectional function whose inverse function is at least computationally difficult to obtain.

The second proof support information management unit 307 searches for proof support information corresponding to right identification information contained in the challenge information.

The second response information computation unit 310 performs operations on a computation result of the unidirectional function and the proof support information to obtain proof information. Next, the first response information is applied to the second challenge information and information containing the proof information, and a value obtained as a result and the first response information (a part of it) are compared. If the value does not satisfy a given relation, a meaningless value is generated as second response information, and if the value satisfies the given relation, change of internal state and computation of response information are performed as described later.

The internal state management unit 312 searches for an internal state corresponding to the right identification information and changes the internal state in accordance with information obtained from the first challenge information or the first response information.

The third unidirectional function computation unit 304, to the proof information and a first random number contained in the first challenge information, applies a unidirectional function whose inverse function is at least computationally difficult to obtain, and the second response information computation unit 310 outputs this value as second response information. The third communication unit 305 transfers the response information to the second communication unit 205.

The second unidirectional function computation unit 203 of the verification instrument 20, to the proof information and a random number of the challenge information, applies a unidirectional function whose inverse function is at least computationally difficult to obtain.

The first response information verification instrument 211 compares a result of the application of the unidirectional function with the second response information, and acknowledges use qualifications if and only if they coincide.

Hereinafter, a detailed description will be made of an authentication protocol of the seventh embodiment.

In the seventh embodiment, proof support information tv of a verification instrument and proof support information tp of a proving instrument are defined as shown below.

$$tv=K-f(dv, n)$$

$$tp=K-f(dp, n) \qquad \text{[Expression 30]}$$

where K is proof information, f is a unidirectional function, dv is private information of the verification instrument, dp is private information of the proving instrument, and n is information for identifying the right to be verified.

First challenge information C1 sent from the verification instrument 20 to the proving instrument 30 satisfies the expression below, where r1 is a random number.

$$C1=(n, r1) \qquad \text{[Expression 31]}$$

The proving instrument 30 sends second challenge information C2 to the verification instrument 20.

$$C2=r2 \qquad \text{[Expression 32]}$$

where r2 is a random number.

The verification instrument 20 computes tv+f(dv, n) to obtain K. Next, it obtains first response information R1 by a computation shown below.

$$R1=(m, f(K, r2, m) \qquad \text{[Expression 33]}$$

where m is information transferred from the verification instrument 20 to the proving instrument 30.

The proving instrument 30 obtains K' by the computation shown below.

$$K'=tp+f(dp, n) \qquad \text{[Expression 34]}$$

When the proof support information tp is correct, K' agrees with the proof information K.

The proving instrument 30 computes f(K', r2, m) and compares an obtained value with the second term of R1. When they agree, it changes an internal state corresponding to the right to be verified in accordance with information m transferred from the verification instrument 20. For example, if m is an amount charged for each use, a prepaid amount is subtracted by the corresponding amount.

Next, the proving instrument 30 obtains second response information R2.

$$R2=f(K', r1) \qquad \text{[Expression 35]}$$

When the proving instrument holds correct proof support information tp, K' matches the proof information K and the following expression holds.

$$R2=f(K, r) \qquad \text{[Expression 36]}$$

The verification instrument 20 obtains f(K, r) and compares it with R2, and the proving instrument 30 acknowledges use qualifications if and only if they coincide.

[Eighth Embodiment]

Next, an eighth embodiment will be described. The eighth embodiment is the same as the seventh embodiment, except that use limitation information is introduced. The configuration of the eighth embodiment is the same as that of the seventh embodiment, which is as shown in FIG. 6.

Hereinafter, a description will be made of an authentication protocol of the eighth embodiment.

In the eighth embodiment, proof support information tv of the verification instrument 20 and proof support information tp of the proving instrument 30 are defined as shown below.

$$tv=K-f(dv, n)$$

$$tp=K-f(dp, n, L) \qquad \text{[Expression 37]}$$

where K is proof information, f is a unidirectional function, dv is private information of the verification instrument 20, dp is private information of the proving instrument 30, n is information for identifying the right to be verified, and L is a use limitation description.

First challenge information C1 sent from the verification instrument 20 to the proving instrument 30 satisfies the expression below, where r1 is a random number.

$$C1=(n, r1) \qquad \text{[Expression 38]}$$

Second challenge information C2 sent from the proving instrument 30 to the verification instrument 20 satisfies an expression below, where r2 is a random number.

$$C2=r2 \qquad \text{[Expression 39]}$$

The verification instrument 20 computes tv+f(dv, n) to obtain K. Next, it obtains first response information R1 by a computation shown below.

$$R1=(m, f(K, r2, m)) \qquad \text{[Expression 40]}$$

where m is information transferred from the verification instrument 20 to the proving instrument 30.

The proving instrument 30 obtains K' by a computation shown below.

$$K'=tp+f(dp, n) \qquad \text{[Expression 41]}$$

When the proof support information tp is correct, K' agrees with the proof information K.

The proving instrument computes f(K', r2, m) and compares an obtained value with the second term of R1. When they agree, it changes an internal state corresponding to the right to be verified in accordance with information m transferred from the verification instrument 20. Next, the proving instrument 30 obtains second response information R2.

$$R2=(L, f(tp+f(dp, n, L), r, L)) \qquad \text{[Expression 42]}$$

When the proving instrument 30 holds correct: proof support information tp, K' matches the proof information K and the following expression holds.

$$R2=(L, f(K, r, L)) \qquad \text{[Expression 43]}$$

The proving instrument 20 computes tv+f(dv, n) and obtains K. Next, it obtains f(K, r) and compares it with the second term of R2, and if and only if they coincide and the use limitation description L satisfies use conditions, the proving instrument 30 acknowledges use qualifications.

Although, in this embodiment, it is determined by the verification instrument 20 whether the use limitation description L satisfies use conditions, the proving instrument 30 may also be substituted for the verification instrument 20.

[Ninth Embodiment]

The ninth embodiment is the same as the eighth embodiment, except that a decryption unit 208 is provided in the verification instrument 20. FIG. 7 shows the configuration of the ninth embodiment. In this figure, locations corresponding to those in FIG. 6 are assigned corresponding reference numerals.

In the ninth embodiment, information handled and a verification procedure are the same as eighth embodiment. The decryption unit 208, if the proving instrument acknowledges use qualifications, uses the proof information K or a value computable by use of K as a key to decrypt encrypted information.

[Tenth Embodiment]

Next, a tenth embodiment will be described. This embodiment is arranged to make a use history manageable.

FIG. 8 shows the configuration of the tenth embodiment. In this figure, locations corresponding to those in FIG. 7 are assigned corresponding reference numerals. In FIG. 8, the proving instrument 30 is provided with a history management unit 308.

Hereinafter, a detailed description will be made of an authentication protocol of the tenth embodiment.

The authentication procedure is shown in FIG. 10 as well. The operations in the fifth to ninth embodiments, which are contained in the tenth embodiment, will be understood from FIG. 10.

In the tenth embodiment, proof support information tv of the verification instrument and proof support information tp of the proving instrument are defined as shown below.

$$tv = K - f(dv, n)$$

$$tp = K - f(dp, n, L) \quad \text{[Expression 44]}$$

where K is proof information, f is a unidirectional function, dv is private information of the verification instrument 20, dp is private information of the proving instrument 30, n is information for identifying the right to be verified, and L is a use limitation description. The use limitation description L consists of a bit string representing, e.g., the expiration of a use period.

The verification instrument 20 computes $tv + f(dv, n)$ to obtain K.

First challenge information C1 sent from the verification instrument 20 to the proving instrument 30 satisfies the expression below, where r1 is a random number.

$$C1 = (n, I, r, s) \quad \text{[Expression 45]}$$

where I is information transferred from the verification instrument to the proving instrument and s is a value derived from the following expression.

$$s = f(K, I, r) \quad \text{[Expression 46]}$$

The proving instrument 30 obtains K' from a computation shown below.

$$K' = tp + f(dp, n, L) \quad \text{[Expression 47]}$$

Next, the proving instrument 30 computes $f(K', I, r)$ and compares the result with s. If and only if they coincide, information containing I is stored in the history memory unit 308.

The proving instrument 30 sends the second challenge information C2 to the verification instrument.

$$C2 = r2 \quad \text{[Expression 48]}$$

where r2 is a random number.

The verification instrument 20 computes $tv + f(dv, n)$ to obtain K. Next, it obtains first response information R1 by a computation shown below.

$$R1 = (m, f(K, r2, m)) \quad \text{[Expression 49]}$$

where m is information transferred from the verification instrument to the proving instrument. The proving instrument obtains K' by a computation shown below.

$$K' = tp + f(dp, n) \quad \text{[Expression 50]}$$

When the proof support information tp is correct, K' matches the proof information K.

The proving instrument 30 computes $f(K', r2, m)$ and compares an obtained value with the second term of R1. When they coicide, it changes an internal state corresponding to the right to be verified in accordance with information m transferred from the verification instrument 20.

Next, the proving instrument 30 obtains second response information R2.

$$R2 = (L, f(tp + f(dp, n, L), r, L)) \quad \text{[Expression 51]}$$

When the proving instrument 30 holds correct proof support information tp, $$tp + f(dp, n, L) = K - f(dp, n, L) + f(dp, n, L) = K \quad \text{[Expression 52]}$$

holds and the proof information K can be restored, so that the following expression holds.

$$R2 = (L, f(K, r, L)) \quad \text{[Expression 53]}$$

The verification instrument 20 computes $f(K, r)$ and compares an obtained value with R2, and if and only if they coincide, the proving instrument 30 acknowledges use qualifications.

Although, in this embodiment, it is determined by the verification instrument 20 whether the use limitation description L satisfies use conditions, the proving instrument 30 may also be substituted for the verification instrument 20.

MD5 and SHA, which are used as examples of unidirectional functions in the above-mentioned embodiments, may also be replaced by a conventional cryptosystem such as DES.

Although, in the above-mentioned embodiments, identical proof information is used for authentication by a verification instrument and acknowledgment of a right by a proving instrument, distinct proof information may be used for each of them and appropriate information may be handled in the proof information memory unit, the private information memory unit, and the proof support information management unit.

Although the above-mentioned embodiments do not assume that tamperproof hardware is used, the risk of illegality can be reduced by protecting the proof information memory unit, the private information memory unit, and the unidirectional function computation unit by tamperproof hardware.

Although, in the above-mentioned embodiments, a use qualification verification device of the present invention is used to control software execution, proof support information can be used as a ticket commonly used in various services offered in actual life.

Although, in the above-mentioned embodiments, a value resulting from subtracting a value obtained by using a unidirectional function from proof information is used as proof support information, the result of applying to the proof information a combination of operations each of which has its inverse operation, such as bit-wise exclusive or, may be used as the proof support information.

APPLICATION EXAMPLE

Next, a description will be made of a concrete application example of an embodiment. Hereinafter, proof support information will be referred to as a ticket.

First, a description will be made of a case where the present invention is used for access control of software.

Figure 16:
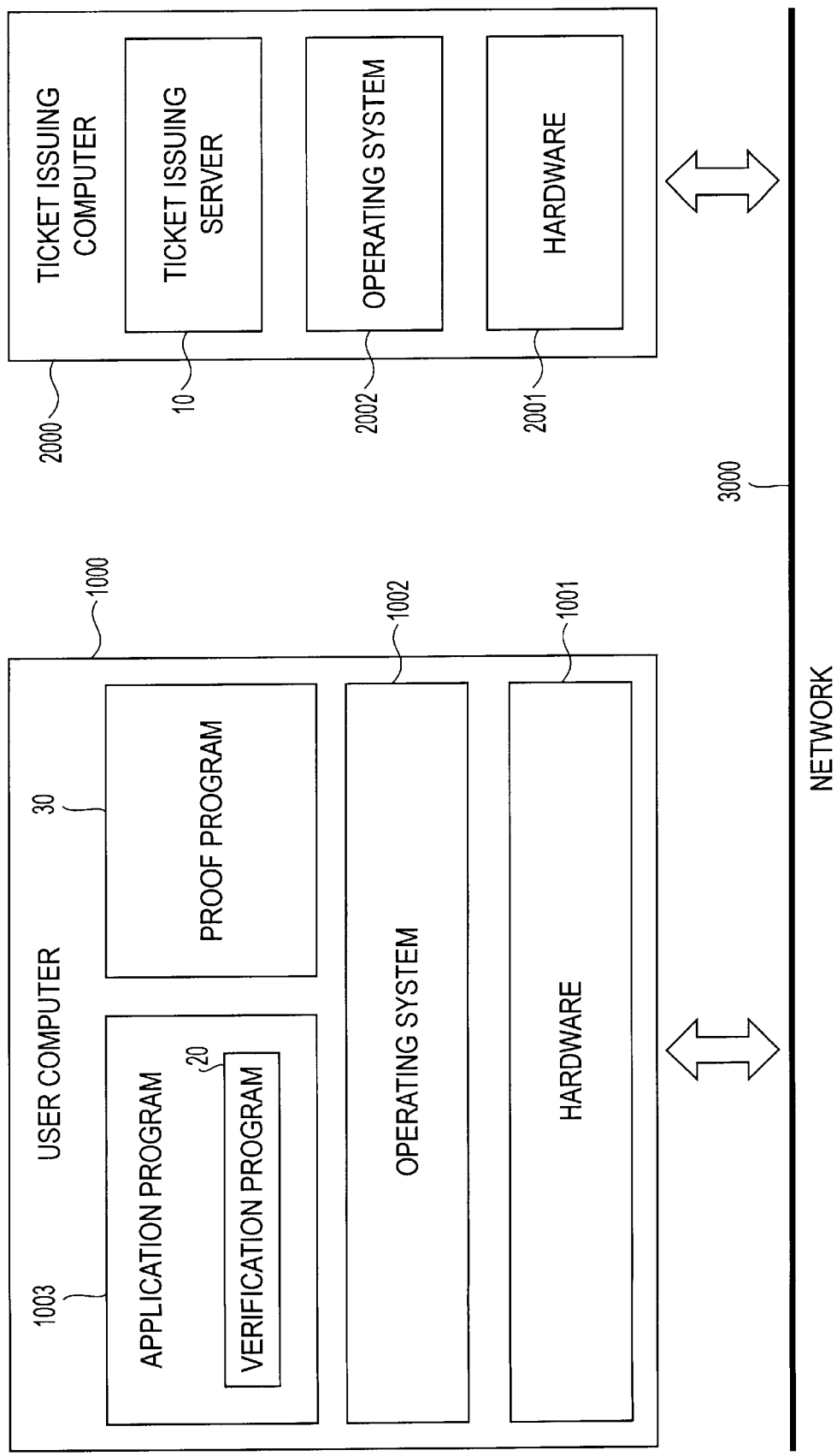
FIG. 16 is a block diagram showing a first application example of an embodiment of the present invention.

FIG. 16 shows an example that access control of software is performed on a network. In FIG. 16, locations corresponding to those in FIG. 1 are assigned corresponding reference numerals. In FIG. 16, a user computer 1000 and a ticket issuing computer 2000 are connected by a network 3000. The network 3000 may be either WAN or LAN. The user computer 1000 has a given operating system 10002 installed in the hardware 1001; on the operating system 1002, an application program 1003 and a proof program 30 operate. A verification program 20 is embedded in the application program 1003. The application program 1003 may be distributed either in the form of recording media or on-line. It is desirable that a part of the proof program 30 is executed on a tamperproof device installed in the user computer 1000.

The ticket issuing computer 2000 also has hardware 2001 and an operating system 2002 so that a ticket issuing server 30 operates.

When wishing to use the application 1003, a user requests the ticket issuing server to issue proof support information (ticket). This request involves a user identification number and an application identification number. According to the user identification number and the application identification number, the ticket issuing server 10 fetches the user's private information, public key modulus, and proof information. It computes proof support information and passes it to the proof program 20 of the user computer 1000.

Subsequently, the proof program 30 and the verification program 20 exchange challenge information C and response information R between them to perform authentication, and if the authentication succeeds, the use of the application program is permitted.

A conceivable method of protecting the software (application 1003) is to encrypt at least a part of the software. Let an encryption key of the software be K and a random number be r. It is desirable in terms of safety that the key K itself is not contained in the software. When the key K itself is not contained in the software, a part of the encrypted software has only to be decrypted to check whether given conditions are satisfied.

Figure 17:
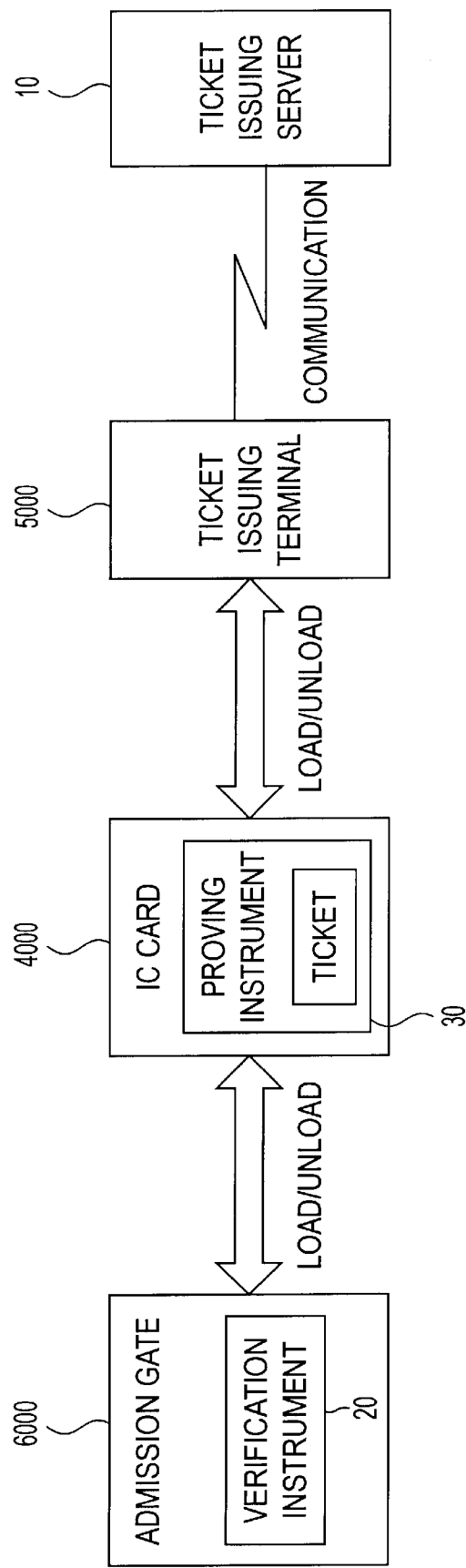
FIG. 17 is a block diagram showing a second application example of an embodiment of the present invention.

Next, a description will be made of an example of using an embodiment for a ticket examining device. FIG. 17 shows a ticket examining system to which this embodiment is applied. In this figure, a program for implementing the proving instrument 30 is installed in an IC card 4000. A ticket issuing terminal 5000 can mount and dismount IC cards and writes proof support information (a ticket) to the IC card 4000 through communication with the ticket issuing server 30. At admission, a user presents the IC card 4000 to an admission gate 6000 (e.g., by inserting it to a slot), and at this time, a verification device 10 of the admission gate 6000 and a proving device 20 of the IC card 4000 communicate with each other for authentication. If the authentication succeeds, the user can pass through the admission gate 6000.

Generally, hash is several thousands of times as fast as the public key cryptosystem. According to Bruce Schneier, Applied Cryptography (second edition), Wiley, 1996, when the MD5 algorithm to compute 128-bit digests is executed by a processor (486SX™ with 33 MHz) manufactured by Intel Corporation in the U.S., encoding can be performed at 174MB per second. According to the above-mentioned literature, in order to execute an RSA cryptosystem with a modulus of 1024 bits and a public key of 8 bits by SPARC2, 0.97 seconds are required for signature and 0.08 seconds for verification. Accordingly, by changing an authentication mechanism from a public key cryptosystem to the, the amount of computation can be reduced to one several thousandths and execution speed can be improved.

According to a use qualification verification device as described above, access to software can be controlled efficiently. Furthermore, by using proof support information in the verification instrument, hardware capable of executing arcade games and a variety of services can be limited, so that license fees for the hardware can be collected and a franchise system can be implemented.

What is claimed is:

1. A use qualification verification device comprising a proof support information issuance unit, a verification unit, and a proof unit, wherein said proof support information issuance unit comprises:

a proof information management part that manages proof information used for authentication of use qualifications;

a private information management part that manages private information;

a first unidirectional function computation part that, to at least private information managed by said private information management part, applies a unidirectional function whose inverse function is at least computationally difficult to obtain;

a proof support information computation part that computes proof support information, based on private information managed by said private information management part and a computation result of said first unidirectional function computation part; and a first communication part that sends and receives information in the process of computation of proof support information;

wherein said verification unit comprises:

a proof information memory part that stores proof information;

a challenge information computation part that computes challenge information;

a second unidirectional function computation part that applies a unidirectional function whose inverse function is at least computationally difficult to obtain;

a response information verification part that lets said second unidirectional function computation part act on the proof information stored in said proof information memory unit and a value obtained based on a part or all of the challenge information and checks whether an obtained result and the response information are equal; and a second communication part that sends and receives information in the process of authentication of use qualifications; and wherein said proof unit comprises:

a private information memory part that stores private information;

a proof support information management part that manages proof support information used to compute response information;

a third unidirectional function computation part that applies a unidirectional function whose inverse function is at least computationally difficult to obtain;

a response information computation part that lets said third unidirectional function computation part act on a part or all of the challenge information, the private information stored in said private information memory part, and a value obtained based on the proof support information managed by said proof support information management part to compute response information; and a third communication part that sends and receives information in the process of authentication of use qualifications and in the process of proof support information computation.

2. A use qualification verification device comprising a proof support information issuance unit, a verification unit, and a proof unit, wherein said proof support information issuance unit comprises:

a proof information management part that manages proof information used for authentication of use qualifications;

a private information management part that manages private information;

a first unidirectional function computation part that, to at least private information managed by said private information management part, applies a first unidirectional function whose inverse function is at least computationally difficult to obtain;

a proof support information computation part that computes proof support information, based on private information managed by said private information management part and a computation result of said first unidirectional function computation part; and a first communication part that sends and receives information in the process of computation of proof support information;

wherein said verification unit comprises:

a private information memory part that stores private information;

a first proof support information management part that manages proof support information;

a challenge information computation part that computes challenge information;

a second unidirectional function computation part that applies a unidirectional function whose inverse function is at least computationally difficult to obtain;

a response information verification part that lets said second unidirectional function computation part act on the private information stored in said first, proof information memory unit and a value obtained based on a part or all of the challenge information and checks whether an obtained result and the response information are equal; and a second communication part that sends and receives information in the process of authentication of use qualifications; and wherein said proof unit comprises:

a second private information memory part that stores private information;

a second proof support information management part that manages proof support information used to compute response information;

a third unidirectional function computation part that applies a unidirectional function whose inverse function is at least computationally difficult to obtain;

a response information computation part that lets said third unidirectional function computation part act on a part or all of the challenge information, the private information stored in said second private information memory part, and a value obtained based on the proof support information managed by said second proof support information management part to compute response information; and a third communication part that sends and receives information in the process of authentication of use qualifications and in the process of proof support information computation.

3. The use qualification verification device according to claim 1, wherein said proof information management part manages a use limitation description, which gives information indicating use conditions, together with proof information, and said proof support information management part manages the use limitation description together with proof support information, and the use limitation description is used to compute proof support information in said proof part and response information in said proof part.

4. The use qualification verification device according to claim 1, wherein said use qualification verification device includes a decryption part that, if use qualifications are acknowledged, decrypts information by using proof information or a value obtained from the proof information as a decryption key of said decryption part.

5. The use qualification verification device according to claim 1, wherein said use qualification verification device includes a history management part that manages a history of use qualification verifications, the proof information memory part or a first proof support information management part manages transfer information together with the proof information or proof support information, the challenge information further contains the transfer information, and said transfer information is stored in the history management part during use qualification verification.

6. A use qualification verification device comprising a proof support information issuance unit, a verification unit, and a proof unit, wherein said proof support information issuance unit comprises:

a proof information management part that manages proof information used for authentication of use qualifications;

a private information management part that manages private information;

a first unidirectional function computation part that, to at least the private information managed by said private information management part, applies a unidirectional function whose inverse function is at least computationally difficult to obtain;

a proof support information computation part that computes proof support information based on the private information managed by said private information management part and the computation results of said first unidirectional function computation part; and a first communication part that sends and receives information in the process of computation of proof support information;

wherein said verification unit comprises:

a proof information memory part that stores proof information;

a first challenge information computation part that computes first challenge information;

a second unidirectional function computation part that applies a unidirectional function whose inverse function is at least computationally difficult to obtain;

a first response information computation part that lets said second unidirectional function computation part act on received second challenge information to compute first response information;

a first response information verification part that lets the second unidirectional function computation part act on the proof information stored in said proof information memory unit and a value obtained based on a part or all of the first challenge information and checks whether an obtained result and second response information are equal; and a second communication part that sends and receives information in the process of authentication of use qualifications; and wherein said proof unit comprises:

a private information memory part that stores private information;

a proof support information management part that manages proof support information used to create response information;

an internal state management part that manages an internal state corresponding to proof support information;

a second challenge information computation part that computes challenge information;

a third unidirectional function computation part that applies a unidirectional function whose inverse function is at least computationally difficult to obtain;

a second response information computation part that lets said third unidirectional function computation part act on a part or all of received information, the private information stored in said private information memory part, and a value obtained based on the proof support information managed by said proof support information management part to compute second response information;

a second challenge information computation part that computes second challenge information;

a second response information verification part that lets said third unidirectional function computation part act on the first response information, a part or all of the second challenge information, the private information stored in said private information memory part, and a value obtained based on the proof support information managed by said proof support information management part and checks whether an obtained result and response information are equal; and a third communication part that sends and receives information in the process of authentication of use qualifications and in the process of proof support information computation.

7. A use qualification verification device comprising a proof support information issuance unit, a verification unit, and a proof unit, wherein said proof support information issuance unit comprises:

a proof information management part that manages proof information used for authentication of use qualifications;

a private information management part that manages private information;

a first unidirectional function computation part that, to at least the private information managed by said private information management part, applies a unidirectional function whose inverse function is at least computationally difficult to obtain;

a proof support information computation part that computes proof support information based on the private information managed by said private information management part and the computation results of said first unidirectional function computation part; and a first communication part that sends and receives information in the process of computation of proof support information;

wherein said verification unit comprises:

first private information memory part that stores private information;

a first proof support information management part that manages proof support information;

a first challenge information computation part that computes first challenge information;

a second unidirectional function computation part that applies a unidirectional function whose inverse function is at least computationally difficult to obtain;

a first response information computation part that lets said second unidirectional function computation part act on the received second challenge information to compute first response information;

a first response information verification part that lets said second unidirectional function computation part act on the proof information stored in said proof information memory unit and a value obtained based on a part or all of the first challenge information and checks whether an obtained result and second response information are equal; and a second communication part that sends and receives information in the process of authentication of use qualifications; and wherein said proof unit comprises:

a second private information memory part that stores private information;

a second proof support information management part that manages proof support information used to create response information;

an internal state management part that manages an internal state corresponding to proof support information;

a second challenge information computation part that computes challenge information;

a third unidirectional function computation part that applies a unidirectional function whose inverse function is at least computationally difficult to obtain;

a second response information computation part that lets said third unidirectional function computation part act on a part or all of received information, the private information stored in said private information memory part, and a value obtained based on the proof support information managed by said proof support information management part to compute second response information;

a second challenge information computation part that computes second challenge information;

a second response information verification part that lets said third unidirectional function computation part act on the first response information, a part or all of the second challenge information, the private information stored in said private information memory part, and a value obtained based on the proof support information managed by said proof support information management part and checks whether an obtained result and response information are equal; and a third communication part that sends and receives information in the process of authentication of use qualifications and in the process of proof support information computation.

8. The use qualification verification device according to claim 6, wherein said proof information management part manages a use limitation description, which gives information indicating use conditions, together with proof information, and said proof support information management part manages the use limitation description together with proof support information, and the use limitation description is used to compute proof support information in the proof part and response information in the proof part.

9. The use qualification verification device according to claim 6, wherein said use qualification verification device includes a decryption part that, if use qualifications are acknowledged, decrypts information by using proof information or a value obtained from the proof information as a decryption key of said decryption part.

10. The use qualification verification device according to claim 6, wherein said use qualification verification device includes a history management part that manages a history of use qualification verifications, and said proof information memory part or first proof support information management part manages transfer information together with proof information or proof support information, and challenge information further contains the transfer information and said transfer information is stored in the history management part during use qualification verification.

* * * * *